Jan. 8, 1957 F. C. WILLIAMS ET AL 2,776,794

ELECTRONIC CIRCUIT FOR MULTIPLYING BINARY NUMBERS

Filed March 13, 1950 31 Sheets-Sheet 1

F. C. Williams
A. A. Robinson

*Inventors*

By *Moore and Hall*
*Attorneys*

F. C. Williams
A. A. Robinson

*Inventors*

By Moore and Hall
*Attorneys*

Jan. 8, 1957 F. C. WILLIAMS ET AL 2,776,794

ELECTRONIC CIRCUIT FOR MULTIPLYING BINARY NUMBERS

Filed March 13, 1950 31 Sheets-Sheet 3

F. C. Williams
A. A. Robinson

*Inventors*

By Moore and Hall

*Attorneys*

ELECTRONIC CIRCUIT FOR MULTIPLYING BINARY NUMBERS

Filed March 13, 1950 31 Sheets-Sheet 4

F. C. Williams
A. A. Robinson

*Inventors*

By Moore and Hall

*Attorneys*

ELECTRONIC CIRCUIT FOR MULTIPLYING BINARY NUMBERS

Filed March 13, 1950 31 Sheets-Sheet 5

F. C. Williams
A. A. Robinson
Inventors
By Moore and Hall
Attorneys

ELECTRONIC CIRCUIT FOR MULTIPLYING BINARY NUMBERS

Filed March 13, 1950 31 Sheets-Sheet 6

F. C. Williams
A. A. Robinson
*Inventors*
By Moore and Hall
*Attorneys*

ELECTRONIC CIRCUIT FOR MULTIPLYING BINARY NUMBERS

Filed March 13, 1950 31 Sheets-Sheet 7

F. C. Williams
A. A. Robinson
*Inventors*

By Moore and Hall
*Attorneys*

Jan. 8, 1957 F. C. WILLIAMS ET AL 2,776,794

ELECTRONIC CIRCUIT FOR MULTIPLYING BINARY NUMBERS

Filed March 13, 1950 31 Sheets-Sheet 8

F. C. Williams
A. A. Robinson
*Inventors*

By Moore and Hall

*Attorneys*

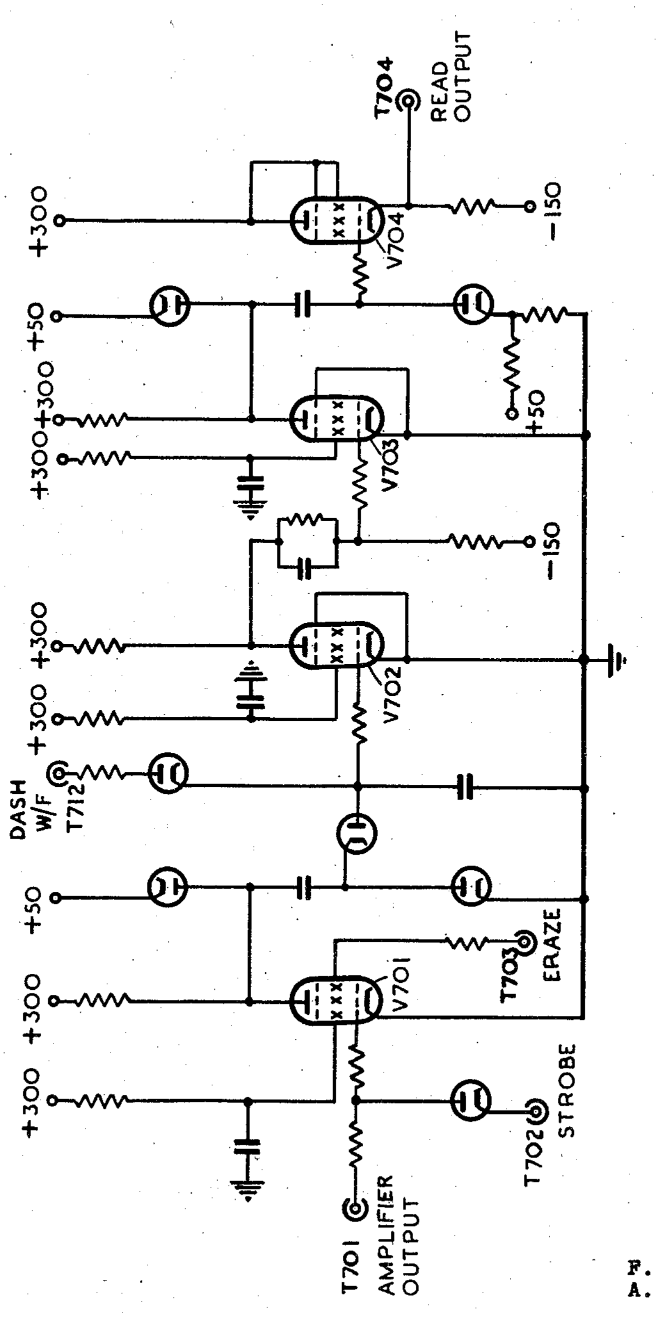
Fig.7.a
F. C. Williams
A. A. Robinson
*Inventors*
By Moore and Hall
*Attorneys*

ELECTRONIC CIRCUIT FOR MULTIPLYING BINARY NUMBERS
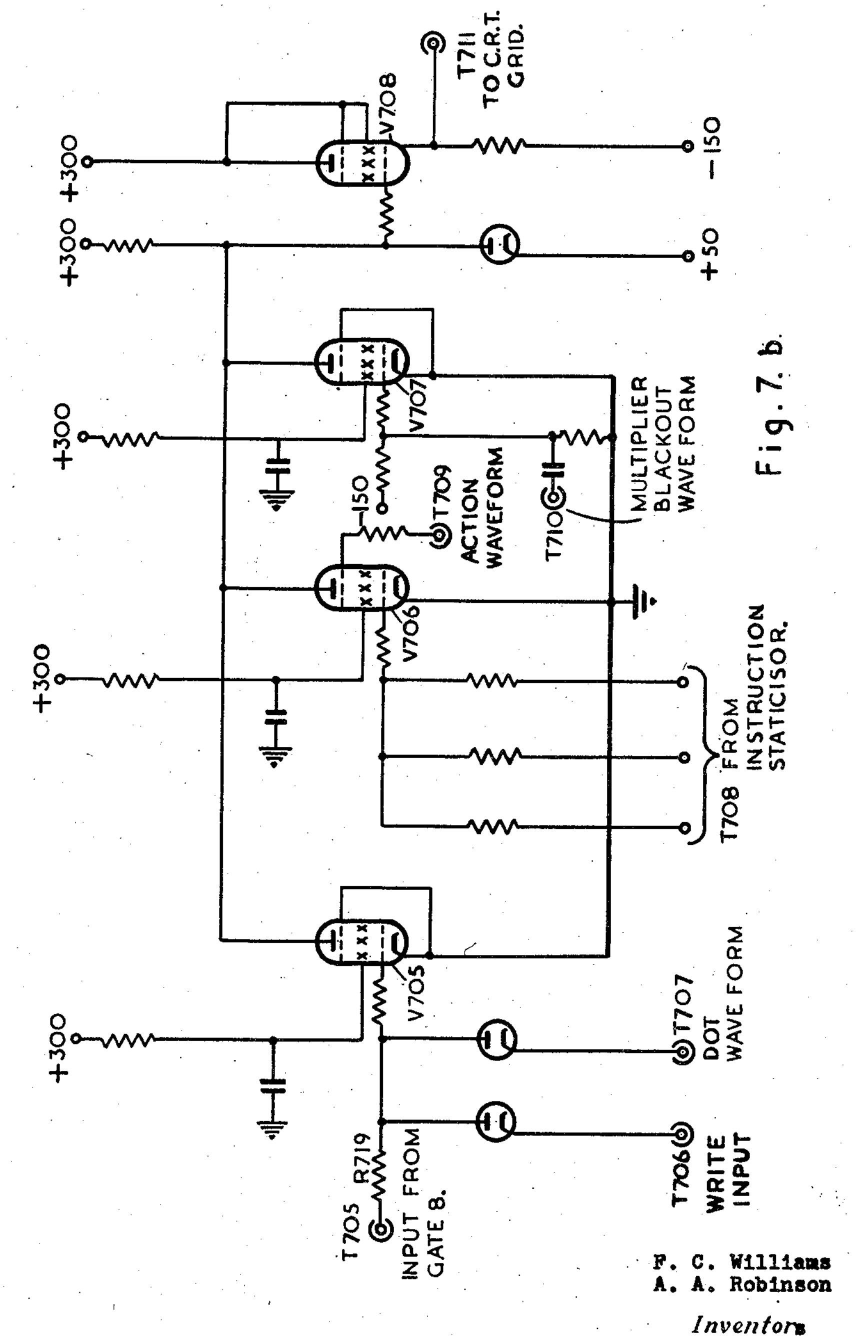
Fig. 7. b
F. C. Williams
A. A. Robinson
*Inventors*
By Moore and Hall
*Attorneys*

Jan. 8, 1957 F. C. WILLIAMS ET AL 2,776,794

ELECTRONIC CIRCUIT FOR MULTIPLYING BINARY NUMBERS

Filed March 13, 1950 31 Sheets-Sheet 11

S, D OPERATION

F. C. Williams
A. A. Robinson
*Inventors*

By Moore and Hall
*Attorneys*

F. C. Williams
A. A. Robinson
Inventors
By [signature]
Attorneys

ELECTRONIC CIRCUIT FOR MULTIPLYING BINARY NUMBERS

F. C. Williams
A. A. Robinson
*Inventors*

By Moore and Hall
*Attorneys*

Jan. 8, 1957 F. C. WILLIAMS ET AL 2,776,794

ELECTRONIC CIRCUIT FOR MULTIPLYING BINARY NUMBERS

Filed March 13, 1950 31 Sheets-Sheet 14

F. C. Williams
A. A. Robinson
*Inventors*
By Moore and Hall
*Attorneys*

ELECTRONIC CIRCUIT FOR MULTIPLYING BINARY NUMBERS

F. C. Williams
A. A. Robinson
*Inventors*
By Moore and Hall
*Attorneys*

Jan. 8, 1957 F. C. WILLIAMS ET AL 2,776,794

ELECTRONIC CIRCUIT FOR MULTIPLYING BINARY NUMBERS

Filed March 13, 1950 31 Sheets-Sheet 16

F. C. Williams
A. A. Robinson
*Inventors*

By Moore and Hall
*Attorneys*

F. C. Williams
A. A. Robinson
*Inventors*
By Moore and Hall
*Attorneys*

F. C. Williams
A. A. Robinson
Inventors
By Moore and Hall
Attorneys

ELECTRONIC CIRCUIT FOR MULTIPLYING BINARY NUMBERS

Filed March 13, 1950

F. C. Williams
A. A. Robinson
*Inventors*
*By* Moore and Hall
*Attorneys*

Jan. 8, 1957 F. C. WILLIAMS ET AL 2,776,794

ELECTRONIC CIRCUIT FOR MULTIPLYING BINARY NUMBERS

Filed March 13, 1950 31 Sheets-Sheet 20

F. C. Williams
A. A. Robinson
*Inventors*

By Moore and Hall
*Attorneys*

F. C. Williams
A. A. Robinson
*Inventors*
By Moore and Hall
*Attorneys*

ELECTRONIC CIRCUIT FOR MULTIPLYING BINARY NUMBERS

F. C. Williams
A. A. Robinson *Inventors*

By Moore and Hall
*Attorneys*

F. C. Williams
A. A. Robinson
Inventors
By Morris and Hall
Attorneys

F. C. Williams
A. A. Robinson
*Inventors*
By Moore and Hall
*Attorneys*

ELECTRONIC CIRCUIT FOR MULTIPLYING BINARY NUMBERS

Filed March 13, 1950 31 Sheets-Sheet 25

F. C. Williams
A. A. Robinson
*Inventors*

By Moore and Hall
*Attorneys*

F. C. Williams
A. A. Robinson
*Inventors*
By Moore and Hall
*Attorneys*

F. C. Williams
A. A. Robinson
*Inventors*

By Moore and Hall
*Attorneys*

F. C. Williams
A. A. Robinson
*Inventors*
By Moore and Hall
*Attorneys*

ELECTRONIC CIRCUIT FOR MULTIPLYING BINARY NUMBERS

F. C. Williams
A. A. Robinson
Inventors
By Moore and Hall
Attorneys

F. C. Williams
A. A. Robinson
*Inventors*

By Morrison & Hall (signature)
*Attorneys*

F. C. Williams
A. A. Robinson
*Inventors*

By Moore and Hall
*Attorneys*

United States Patent Office 2,776,794

Patented Jan. 8, 1957

2,776,794

ELECTRONIC CIRCUIT FOR MULTIPLYING BINARY NUMBERS

Frederic C. Williams, Timperley, and Arthur A. Robinson, Scunthorpe, England, assignors to National Research Development Corporation, London, England, a corporation of Great Britain

Application March 13, 1950, Serial No. 149,224

Claims priority, application Great Britain March 14, 1949

7 Claims. (Cl. 235—61)

This invention relates to circuit arrangements for performing the operation of multiplication between two numbers, each in binary-digital form in the series mode, i. e. each number being representable in dynamic form as a temporal series of electrical signals.

In binary arithmetic notation a number N is represented by the summation:

$$N=\sum_{k=0}^{k=n-1} a_k 2^k$$

Where $a_k$ is two-valued, being "0" or "1". In the dynamic representation of a binary-digital number, as a temporal series, each electrical signal corresponds to one term of the summation and must be capable of defining either of the significances "0" and "1". In the simplest form of presentation the significance "0" is represented by an electrical pulse of zero amplitude (no pulse) and the significance "1" is represented by the presence of an electrical pulse of finite amplitude, in excess of a chosen threshold value. A static representation of a binary-digital number may be provided by a storage device which converts the temporal series of signals of the dynamically occurring number to a spatial distribution of electrical states, in which each state corresponds to a single term in the summation comprising the number. Such storage devices may take a variety of forms. For example a store may comprise a series of two-state trigger circuits, the two states of each circuit being employed to represent the two values "0" and "1", so that each digit of a number may be represented by the condition of a single one of the series of trigger circuits. Such a storage device may be referred to as a static register or staticisor. Other storages devices which may be utilized to register binary-digital information operate on magnetic storage principles, or by the storage of electrical signals representative of the digits, as travelling sonic or supersonic pulses in acoustic delay lines.

Another form of storage system for binary-digital information employs the storage of electrostatic charge upon the screen of a cathode-ray tube. Such storage systems are described in co-pending U. S. application of F. C. Williams, Serial No. 790,879, filed December 10, 1947; in copending U. S. application of F. C. Williams et al., Serial No. 50,136, filed September 20, 1948; in copending U. S. application of F. C. Williams et al., Serial No. 105,352, filed July 18, 1949 and in copending U. S. application of F. C. Wililams et al., Serial No. 124,192, filed October 28, 1949.

The product of two numbers, D (the multiplicand), and R (the multiplier) is given, in the binary system of notation by:

$$D\times R=\sum_{k=0}^{k=n-1}(a_k 2^k D)$$

where $a_k$ represent the significances ("0" or "1") of the digits of the multiplier R. It can be seen that multiplication thus resolves itself into the summation of a series of terms, each term comprising the number resulting from an operation performed between the multiplicand (itself a summation) and a single digit of the multiplier. This process of multiplication may be more readily followed from the following example, set out in tabular form, in which the numbers 19 (R), and 21 (D) are multiplied together.

| | |
|---|---|
| 10101 | . . . . $D$ (21) |
| 10011 | . . . . $R$ (19) |
| 10101 | . . . . $D$ |
| 10101 | . . . . $D\times2^1$ |
| 00000 | . . . . $D\times0^2$ |
| 00000 | . . . . $D\times0^3$ |
| 10101 | . . . . $D\times2^4$ |
| 110001111 | . . . . $D\times R=399$ |

The least significant digits are written at the right hand end of the two numbers, and it can be seen that the product $D\times R$ is equal to the sum of 5 terms, each of which is the number D multiplied by a separate one of the 5 digits of the number R, and that the product of a multiplication will always require a greater number of digits than each of the factors, but will never require more than the sum of their digits. It will be appreciated that in dynamic binary arithmetic operations, delaying of all the digit pulses in the sequence forming a number, by one inter-digit period is equivalent to multiplication by $2^1$ and that delay by $n$ inter-digit periods is equivalent to multiplication by $2^n$. In a static representation of binary-digital numbers, multiplication by $2^n$ is achieved by transference of the representation of each digit of the number from its existing location to the location corresponding to the digit of $n$th higher order. In a simple graphical representation by the numbers "0" and "1" the series of numbers is moved $n$ places towards the position of higher significance; for example, the number 1, 0, 1(5) multiplied by $2^2$ becomes 1, 0, 1, 0, 0, (20).

If a general-purpose machine or computing device is arranged for multiplication by this process of repeated addition of numbers in the series mode, then the complete operation involving multiplication by the machine of two $n$-digit numbers will occupy a time interval at least equal to $n$ times the time interval required for the expression in dynamic form of an $n$-digit number. It will be apparent, however, that those terms in the repeated addition process which correspond to multiplication of the multiplicand by the "0" digits of the multiplier are zero and do not add to the final sum forming the product.

It is the object of the present invention, therefore, to provide a circuit arrangement for performing the operation of multiplication between numbers in binary-digital form in the series mode, in which the operating time of the multiplier circuit is shortened by omitting from the repeated addition process those terms corresponding to the multiplication by the "0" digits of the multiplier.

According to the invention a multiplying circuit arrangement for binary digital numbers in the series mode comprises a first storage device in which is recorded the number D which is to be multiplied by a second number R which is recorded in a second storage device, means being provided for repeatedly reconstituting in dynamic form the number D and feeding this number to an accumulator storage device in such a fashion that it is added to the existing number stored within the accumulator device, successive reproductions of the number D being initiated at instants corresponding to the occurrence of successive pulses representative of "1" digits, in a pulse train produced by the dynamic reproduction of the number R stored in the second storage device.

It will be apparent that the duration of a multiplication process performed by a multiplier circuit arrangement in accordance with the present invention is approximately proportional to the number of "1's" in the multiplier (R). With normal positive numbers any unused digits at the most significant ends are always "0's" and therefore do not cause wasted time during multiplication. This is not the case, however, with negative numbers represented by the complement notation. As a complement has "1" digits in the unusued positions at the most significant end, the multiplication time if the multiplier (R) is a negative number in complement notation will thus be longer than the time for multiplication by a positive multiplier of the same magnitude.

Negative numbers are expressed as complements by subtracting them from a fixed positive number of greater magnitude and recording the positive difference or complement. In the binary scale, when numbers normally comprise $n$ digits it is customary to choose $2^n$ as the fixed positive number. As an example of the formation of a complement consider that $n=8$ and it is required to record the number −19, then 19 (10011 in the binary scale) is subtracted from $2^8$

```
100000000 . . . . 2^8
000010011 . . . . 19
 11101101 . . . . C(19)
```

The remainder, C(19), is known as the complement of 19 and this is recorded in place of the negative number. It will be noticed that the complement of a complement is the number itself. The process of complementing a complement may be referred to as decomplementing.

If complements are employed in a digital computing device some indication must be given whether a number is a complement or not. This is most conveniently done by restricting the range of positive numbers recorded so that the most significant digit is always a "0" and the occurrence of a "1" in the most significant place of a number will then indicate that the number is a complement. The maximum positive number which can be expressed with $n$ digits is then $2^{n-1}-1$.

It is a further object of the invention therefore to provide a multiplying circuit in accordance with the present invention in which provision is made for both factors to be positive during multiplication.

In accordance with a feature of the invention therefore there is provided sign determining apparatus which examines each factor (R and D) as it is initially loaded in to its appropriate storage device and if a factor is a complement controls a decomplementing operation upon the factor in its storage device before the process of multiplication commences and in dependence upon whether the desired product is required to be a positive or negative number causes the successive partial products to be fed to the accumulator storage device via an adding circuit or a subtracting circuit.

A multiplier circuit arrangement in accordance with the invention conveniently employs, for the storage of the numbers to be multiplied and also for the storage device of the accumulator in which the product is formed, cathode-ray-tube storage units of the type previously referred to. In such storage units, employed as the main storage elements of a serial electronic digital computing machine, numbers, or "words," are stored as the charge conditions at discrete areas, one area for each digit of a number, spaced apart along lines, one number normally occupying a single line, and a scanning operation during a so-called "Action period" by the cathode-ray beam is employed to reconstitute a selected stored number in dynamic form as a train of pulses. This reconstitution process is termed "reading." During such action periods arrangements may be made to erase stored information, and also to impress upon the store new information in such a fashion that it replaces any information which was previously recorded in the operative position in the store. Such impressing of new information is termed "writing." As explained in the copending applications previously referred to and also in copending U. S. application of F. C. Williams et al., Serial No. 93,612, filed May 16, 1949, when cathode-ray-tube storage units of the kind referred to are employed as the main storage elements of binary-digital computing machines the action periods are normally interlaced with so-called "scan periods" during which specific store locations, normally single lines storing single numbers, have the information stored therein regenerated.

In order that the nature of the present invention may be more clearly understood, specific schematic circuit arrangements of multipliers in accordance with this invention, will now be described in which cathode-ray tube storage units are employed. The invention is not however limited to the employment of storage systems of this type and other forms of storage system, such as that previously referred to which employs a series of flip-flop trigger circuits, may alternatively be employed, if the storage is such that reconstitution of the stored number can be initiated at any desired instant. The manner in which such an alternative storage system may be operated to perform the same function as the cathode-ray-tube storage units in the systems to be described, will be analogous to the manner in which the cathode-ray-tube storage units are operated, and will be obvious to those skilled in the art.

The description will be given with reference to the accompanying drawings in which.

Figure 3:
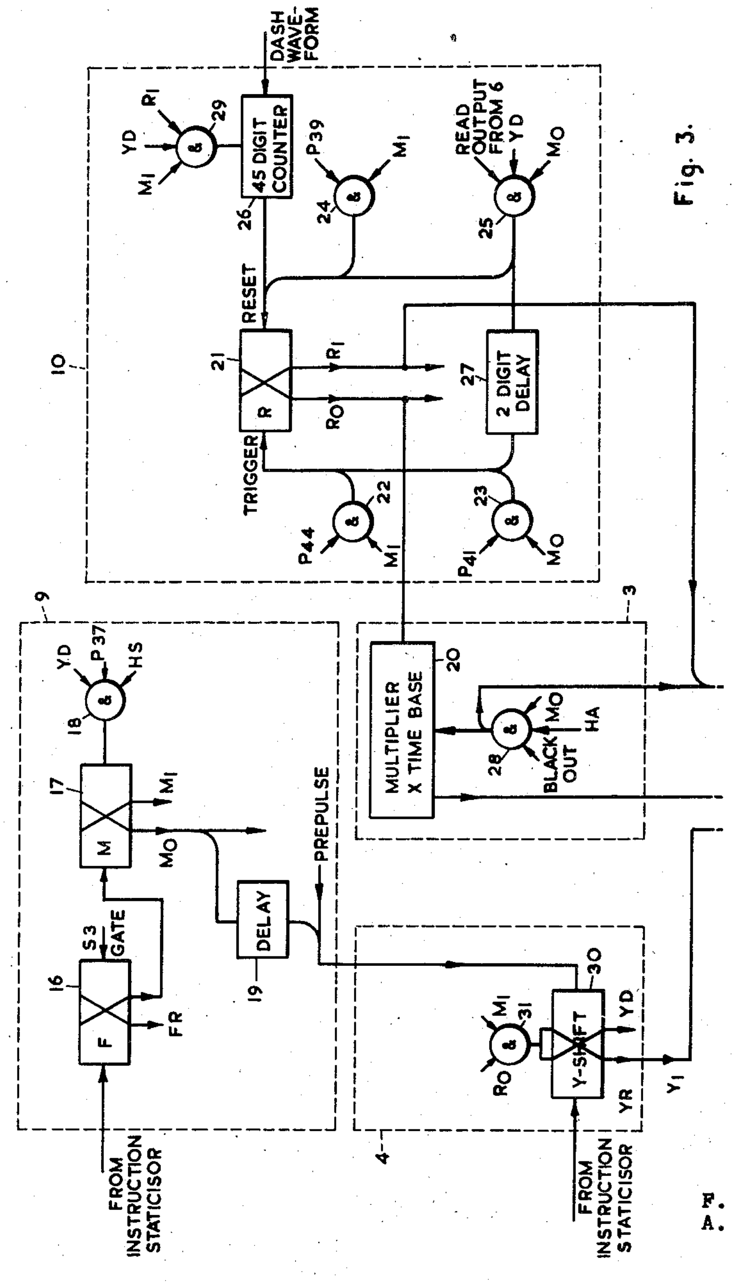
Figure 3:
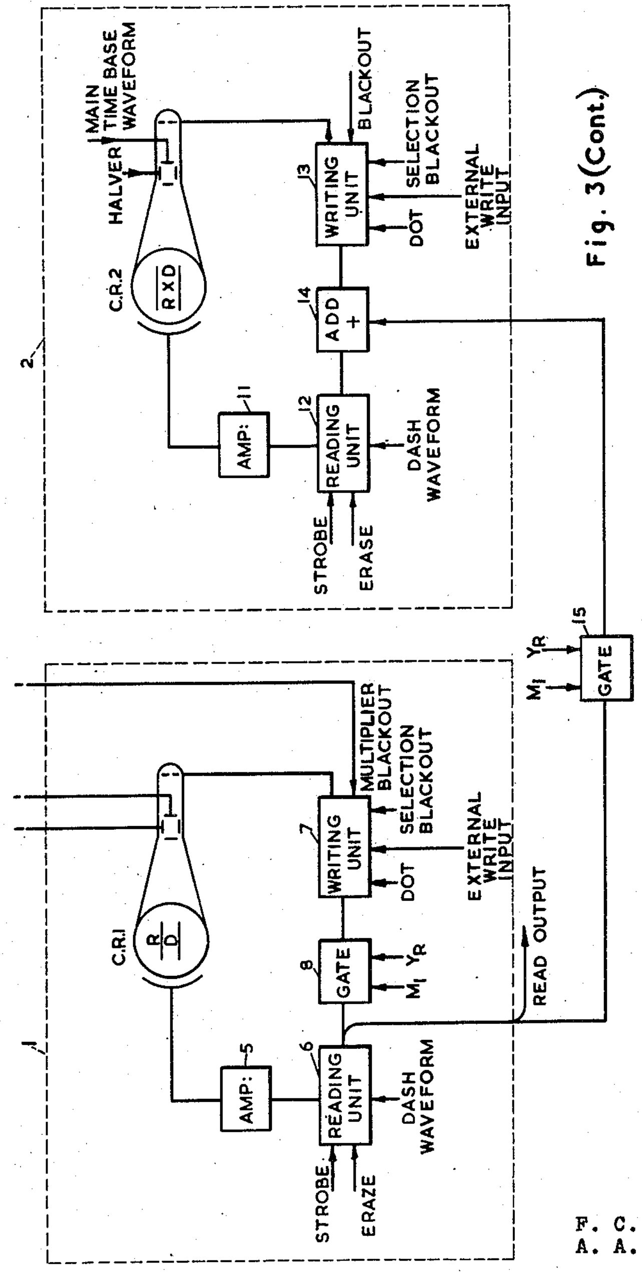

Fig. 3, which comprises Figs. 3 and 3 (cont'd), shows a block schematic diagram of one embodiment of the invention.

Figure 4:
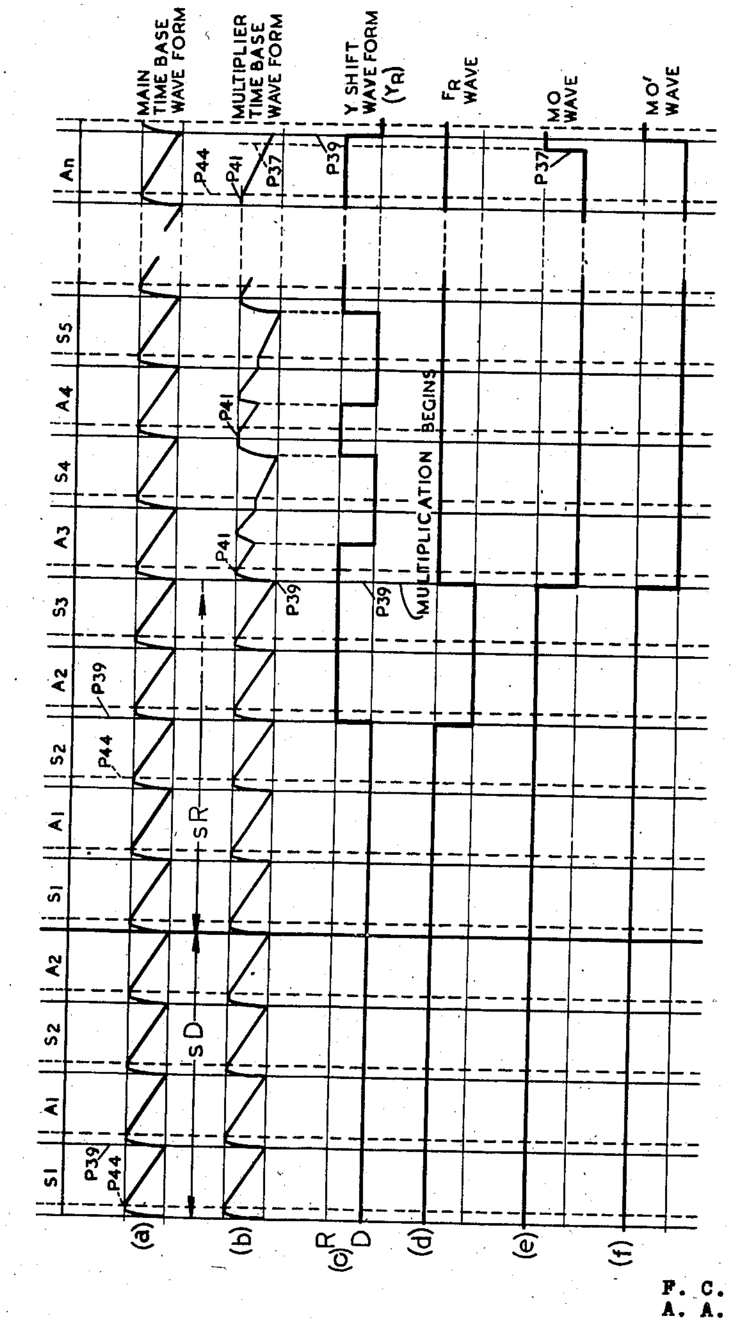

Fig. 4 shows voltage waveforms produced during operation of a multiplier.

Figure 5:
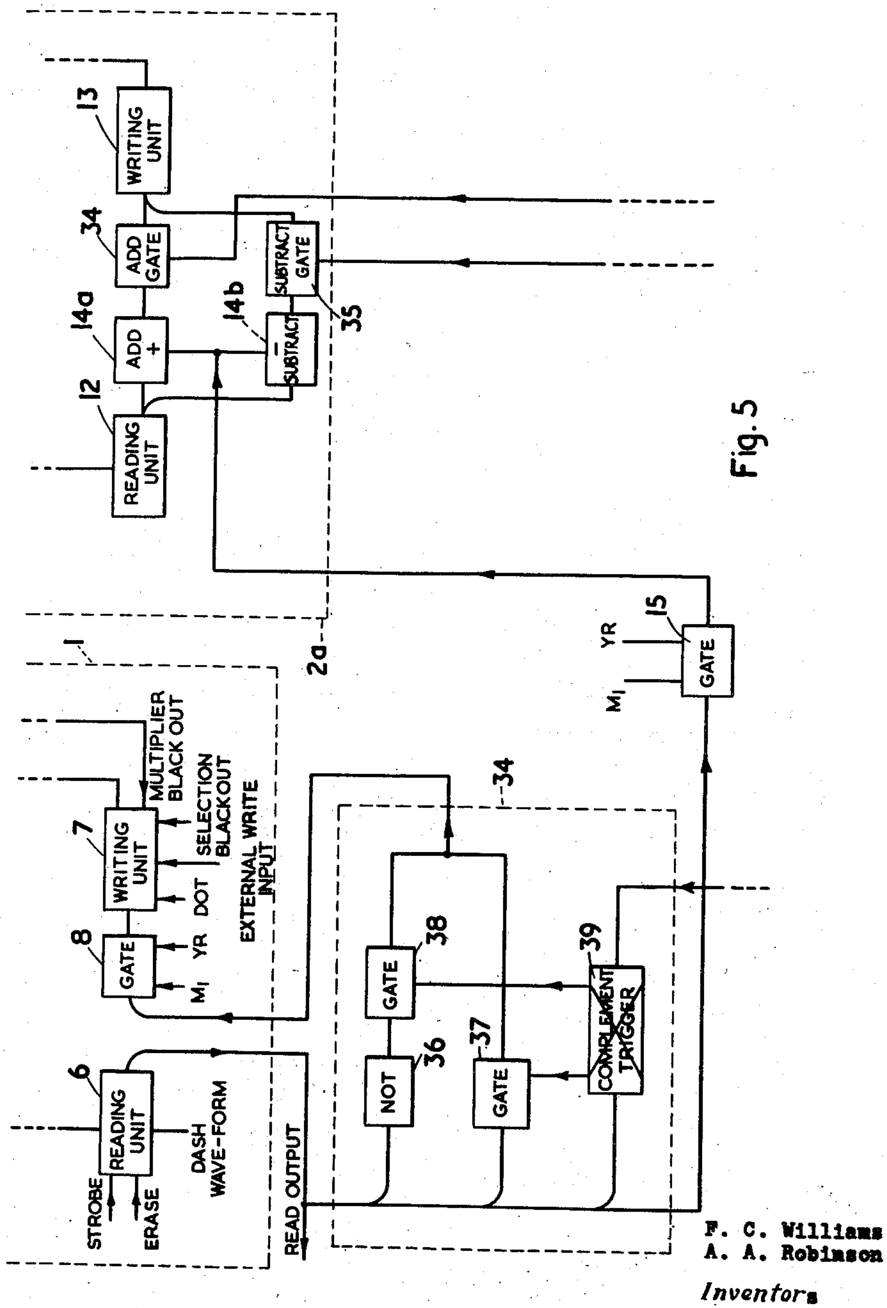
Figure 5:
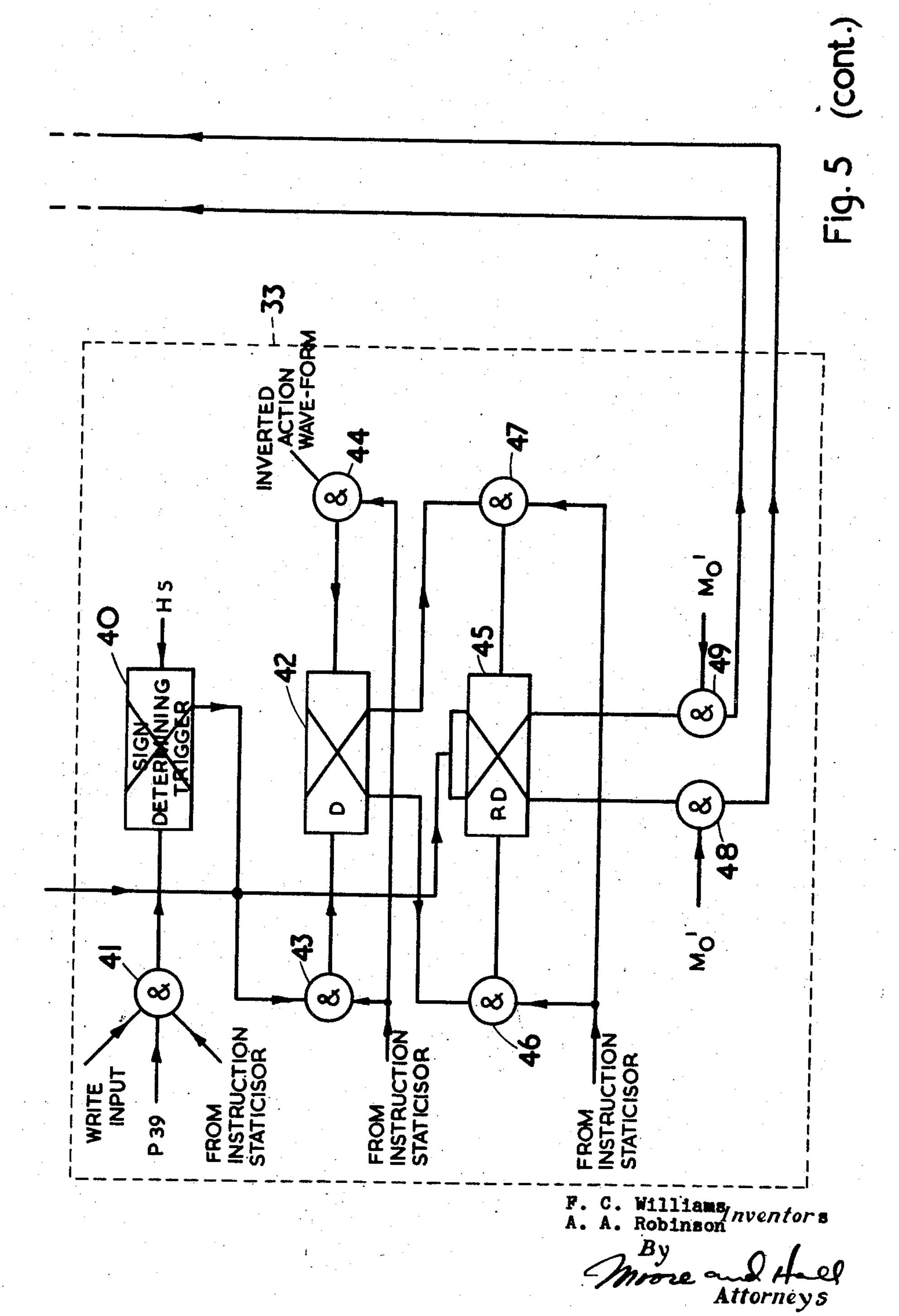

Fig. 5, which comprises Figs. 5 and 5 (cont'd), shows a block schematic diagram of a further embodiment of the invention designed to handle both negative and positive numbers.

Figure 6:
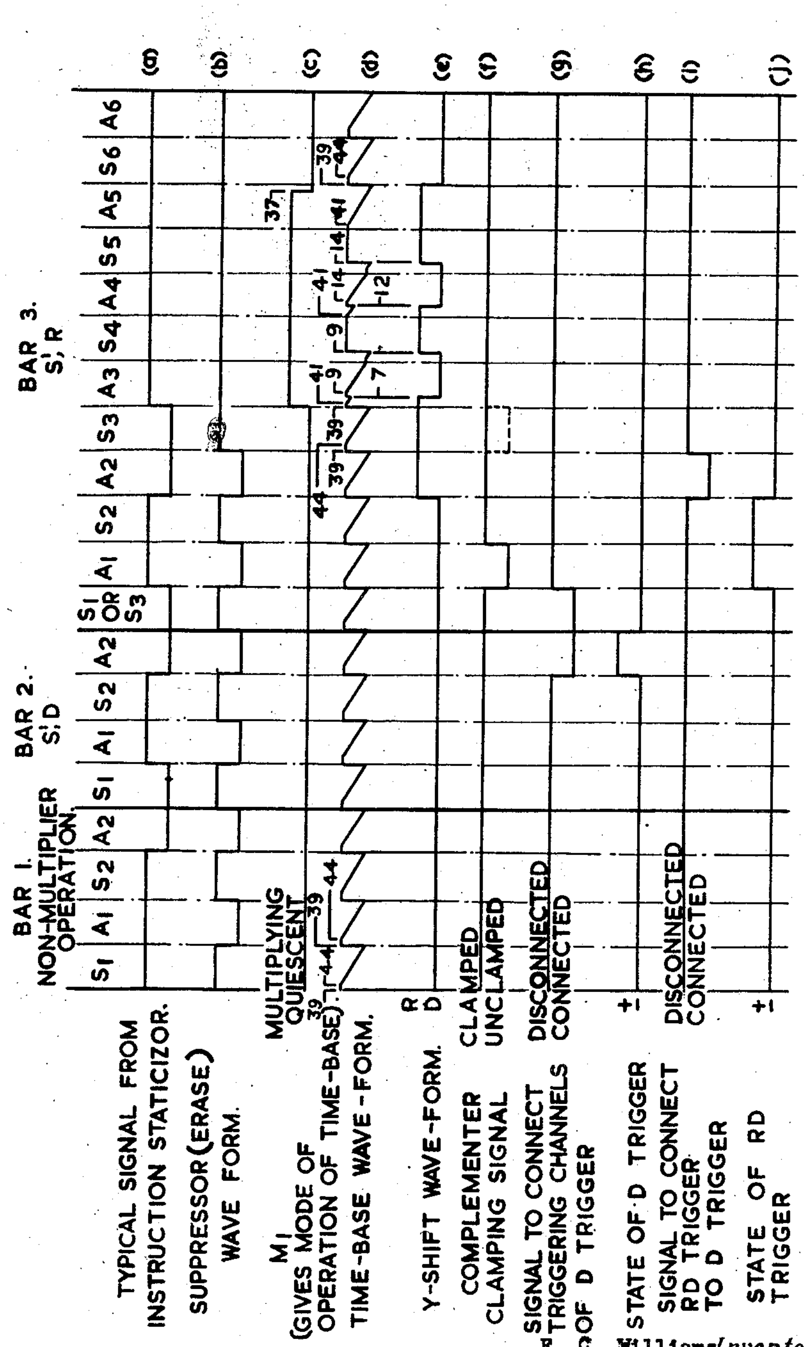

Fig. 6 shows voltage waveforms explanatory of the operation of the embodiment of the invention illustrated in Fig. 5.

Figs. 7–24 show detailed circuit diagrams and explanatory voltage waveforms illustrating the operation of various parts of the arrangements shown in block schematic form in Figs. 3 and 5.

The cathode-ray-tube multiplier to be described is primarily designed to operate as part of a universal computing machine of the kind described in copending U. S. application of F. C. Williams et al., Serial No. 141,176, filed January 30, 1950 or in copending U. S. application of F. C. Williams et al., Serial No. 165,434, filed June 1, 1950, and requires for its operation the provision of various voltage waveforms which are needed for the operation of the main machine. Much of the complexity of the multiplier arises from the fact that it is required to operate in conjunction with a machine, which is itself complex, but it will be obvious, when the operation of the multiplier is understood, that the multiplier can very well be operated as an independent unit by supplying all necessary voltage waveforms from suitable sources. Certain of the control potentials which are required by the multiplier when it is required to multiply, and also during the non-multiplying phases when multiplicand and multiplier are being initially fed into the multiplier, are supplied by the associated computing machine as steady potentials when certain instructions relating to the multiplier are being obeyed by that machine, the steady potentials being provided by static registers or staticisors which are set up by the coded instructions. If the multiplier is being used as an independent unit such control potentials can obviously be supplied by steady potential sources and switches can be employed where necessary to distinguish between the various phases of the multiplier operation.

Figure 1:
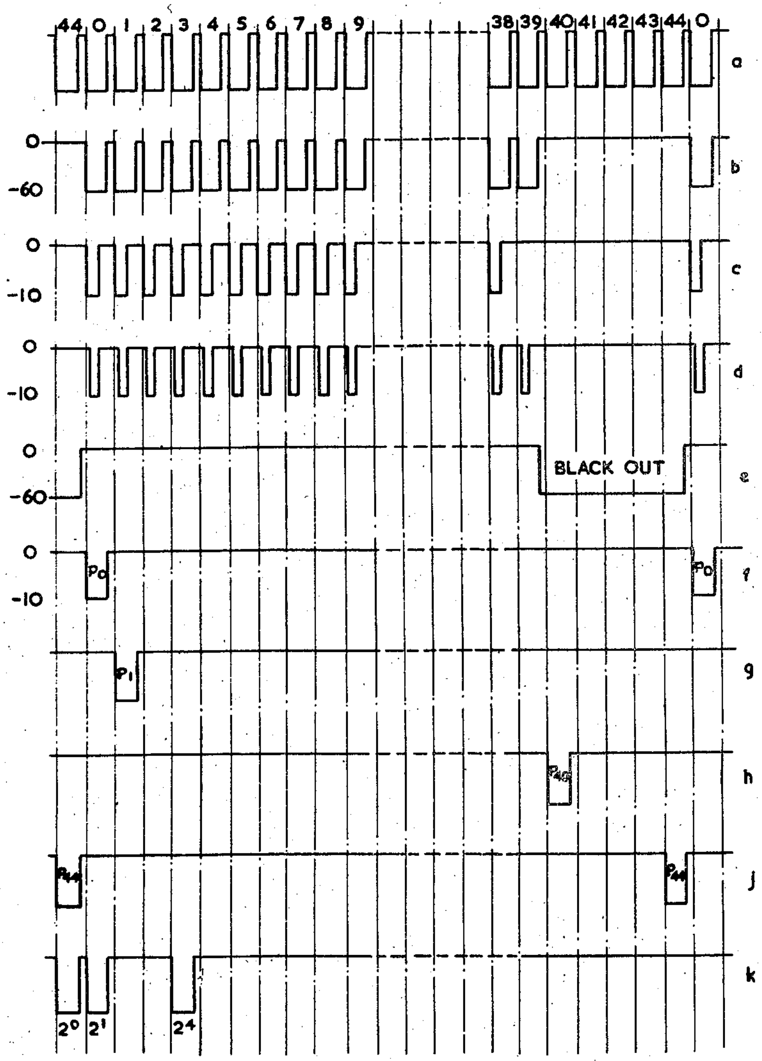
Fig. 1 shows voltage waveforms relating to the operation of cathode-ray-tube storage systems.

Standard voltage waveforms which are required for the operation of cathode-ray-tube storage system of the type referred to and which are required in the multiplier to be described, are illustrated in Fig. 1. These voltage waveforms may be most conveniently derived from an associated computing machine employing cathode ray tube storage, as the versions of these waveforms used in connection with the storage tubes of the multiplier and the storage tubes of an associated machine will be required to be synchronous. It will be assumed that the multiplier operates with a basic number or "word" length of 40 binary digits.

Fig. 1 (*a*) illustrates the fundamental timing wave, the "clock" wave or continuous dash wave from which all other waves may be derived. It is a square or pulse wave comprising negative-going pulses of approximately 6 microseconds duration with a repetition period of approximately 10 microseconds. The real dash wave form Fig. 1 (b) consists of groups of 40 dash or clock pulses separated by intervals corresponding to groups of five suppressed dash pulses. The full period of 45 dash pulses comprises what is sometimes referred to as a "beat" or "minor cycle," i. e. the period involved in the expression in dynamic form of a single (40 digit) word. Figs. 1 (*c*) and 1 (*d*) illustrate dot and strobe waveforms which are related to the dash waveform and are utilised in the actual operation of the cathode ray tube storage systems as explained in the patent specification previously referred to. Continuous versions of the dot and strobe waveforms (i. e. continued through the blackout period) are also provided, but are not indicated in Fig. 1.

The blackout waveform, shown in Fig. 1 (*e*) defines the duration of every word and the timing of the five digit interval between adjacent words and is related to the time-base deflection waveform which is employed in the cathode ray tube stores. The blackout pulse is negative-going and extends from the back edge of the last dash pulse in the dash waveform before the five digit gap to the back edge of the last of the suppressed dash pulses.

Figs. 1 (*f*), (*g*), (*h*) and (*j*) illustrate certain of the pulse waveforms, referred to as the p. pulses, which define the 45 individual dash pulse periods in the continuous dash waveform. Each p. pulse wave comprises a single pulse appropriately positioned in the beat interval and the p. pulses are defined by number, $p_0$ being the first p. pulse following the end of the blackout pulse and $p_{44}$ being the last pulse within the blackout period. The 40 digit positions in every word are defined by pulses $p_0$–$p_{39}$.

Fig. 1 (*k*) illustrates by way of example the pulse train representative of the number 19 (1100100—reading from left to right in ascending significance) and will be seen to consist of negative pulses coincident in timing and duration with appropriate dash pulses or p. pulses.

All the waveforms indicated in Fig. 1 may be required and are available also in polarity-reversed or inverted form.

Figure 2:
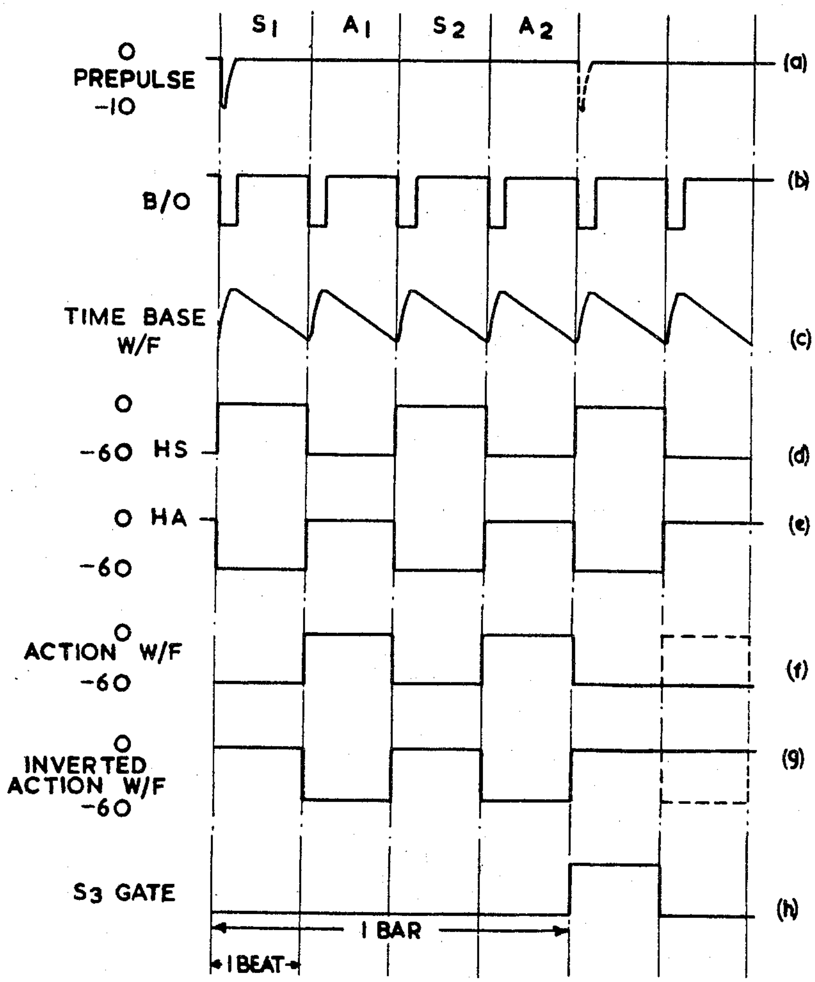
Fig. 2 shows voltage waveforms relating to the operation of cathode-ray-tube storage systems in computing machines.

In addition to the voltage waveforms illustrated in Fig. 1 the rhythmic and control waveforms illustrated in Fig. 2 are also required for the operation of the multiplier and represent waves available in a machine of the type described in the aforesaid copending U. S. applications, Serial Nos. 141,176 or 165,434. In computing machines of this type, employing cathode ray tube storage systems, beats or minor cycles during which writing or reading operations occur in main storage elements are referred to as "Action" beats and are interleaved with "scan" beats during which regeneration of stored data occurs. The fundamental cycle of operations involved in the obeying of an instruction takes place in a number of beats, usually referred to by musical analogy as a "bar." A bar in the simple case comprises 4 beats: scan 1, action 1, scan 2 and action 2 but if the operation proceeding during the fourth (A2) beat is of such a nature (for example a multiplication) that it requires more than one beat for its completion, then the bar is extended as required by further beats which may be numbered S3, A3, S4, A4 etc. Each bar is initiated by a pre-pulse signal, Fig. 2 (*a*), which is caused to be released when the operations of the preceding bar are completed. The prepulse always occurs at the commencement of the first scan beat following completion.

Fig. 2 (*b*) illustrates the timing of the blackout waveform with respect to the beat intervals and Fig. 2 (*c*) illustrates the main time-base deflecting waveform corresponding to the blackout wave. Fig. 2 (*d*) illustrates a halver wave, $H_S$, which is a rectangular wave, positive-going during scan beats and negative-going during action beats and Fig. 2 (*e*) illustrates the inverted form of this wave which is referred to as the $H_A$ wave.

In order to condition various portions of a computing machine of the type referred to, selectively during action or scan beats and to cause such conditioning to be extended over both action and scan beats subsequent to beat S2, when such beats are employed for the continuance of operations commenced during beat S2, the action waveform of Fig. 2 (*f*) and its inverted or paraphased form (the Inverted action waveform) of Fig. 2 (*g*) are required. These action wave forms are related to the prepulse and comprise positive or negative excursions respectively for the A1 and A2 beats following a prepulse.

The dotted prepulse and dotted portions of the action waveforms in Figs. 1 (*a*), 1 (*f*) and 1 (*g*) illustrate this variation in the form of the action waveforms. A further waveform which is required for the control of the multiplier is the S3 Gate wave of Fig. 2 (*h*) which comprises a positive pulse for the duration of the beat S3. This wave will obviously only occur in the machine of the type referred to when the operations being carried out during a bar are such that a prepulse does not occur after A2.

One embodiment of the present invention is illustrated in Fig. 3 which represents in schematic form an electronic binary multiplying circuit which is capable of multiplying together two numbers but which does not include devices for taking account of sign, so that all numbers are handled as if they were positive. For the sake of clarity not all interconnections are completely shown in the block schematic diagram of Fig. 3. With a few exceptions control and signal interconnections are indicated merely by their origins and destinations. Thus, for example, a trigger circuit M is indicated as providing a control voltage output M1 while gates 8, 15, 22, 24, 29 and 31 are indicated as having input connections fed with the $M_1$ wave.

The multiplying circuit arrangement comprises two cathode-ray-tube storage units 1 and 2 embodying cathode-ray-tubes $CR_1$ and $CR_2$. On $CR_1$ the numbers R and D are recorded upon separate lines R and D and there is provided a time base circuit 3 and a transverse or Y-shift control circuit 4 which provide for the scanning of the appropriate line on the tube. A regenerative loop, comprising an amplifier 5 and a reading unit 6 and writing unit 7 coupled by a gate circuit 8, enables recorded information to be continuously regenerated as required and a "read" output to be obtained. Control units 9 and 10 are provided to control the operation of the time-base and Y-shift generators.

The second storage unit 2 comprising a cathode-ray-tube $CR_2$ forms the store or accumulator in which the product $R \times D$ is built-up. $CR_2$ is arranged for recording upon two lines and the necessary time-base circuit (not shown) is provided to produce alternate scanning of the two lines in a repetitive manner, the time-base deflection wave being as indicated in Fig. 2 (*c*). Each line on $CR_2$ has the same storage capacity as either line on $CR_1$, namely 40 digits, and the necessary transverse deflection may be provided by a suitable version of the halver wave so that the line on which the least significant portion of the product is built up is scanned during action beats and the other (most significant line) in scan beats.

A regenerative loop is provided comprising an amplifier 11 and reading unit 12 and a writing unit 13, coupled by an adding circuit 14. As explained in copending U. S. application of F. C. Williams et al., Serial No. 119,306, filed October 3, 1949, now Patent No. 2,633,990, and in the aforesaid copending U. S. application Serial No. 141,176 the regenerative loop including the adding device operates to cause the number written into $CR_2$ at each scan to be the sum of the number pre-existing in the accumulator and the number fed to the adding circuit from $G_1$.

The time-base circuits associated with $CR_1$ and $CR_2$ may be arranged to provide simple linear sweeps or may be arranged to pause at each digit as explained in the aforesaid copending U. S. applications Serial Nos. 50,136 and 124,192.

The regenerative loop circuits of both $CR_1$ and $CR_2$ are fed as indicated with all the basic voltage waveforms, namely dot, dash, and strobe pulses which are required for the operation of the regenerative and reading and writing functions of the cathode-ray-tube storage systems. Erasing terminals are also provided, which, when stimulated by suitable potentials, interrupt the regenerative loops so that stored data which is scanned during the stimulation is erased. Stimulation of the erase input is thus necessary during initial writing operations to ensure that any pre-existing information is removed. The regenerative loop of unit 2 has also fed to it the blackout waveform to cause blackout during flyback periods of the scanning motion of the tube beam. The regenerative loop of unit 1 has a special multiplier blackout wave fed to it, as will be explained, to cause blackout during the flybacks of the special multiplier time bases. Both units 1 and 2 have also fed to them potentials which ensure that the tubes $CR_1$ and $CR_2$ are blacked out except during those beats when the multiplier is operating. These potentials will be normally controlled as previously explained by staticised instructions in a co-operating machine.

The general principle of operation of the system, assuming that the numbers R and D are already recorded upon $CR_1$, is as follows. The R line of $CR_1$ is first scanned, the time-base sweep commencing at the back edge of $p_{41}$. When the first "1" digit is encountered it is not regenerated as a "1," the action of the regenerative loop being inhibited by the gate 8 so that the "1" is replaced by a "0." The read output obtained from the inhibited regenerative loop corresponding to this "1" digit will occur in coincidence with pulse $pn-3$ if the "1" digit is the $n$th digit in the number R and the presence of this "read" digit is utilized to cause the time-base waveform to fly back at the end of pulse $pn$—3. After a pause of two inter-digit periods from the commencement of flyback the time-base circuit is again triggered and commences scanning of the D line. The run-down of the time base for the second time will thus commence at the trailing edge of pulse $pn-1$. An appropriate transverse shift is applied to $CR_1$ during this second sweep by the Y shift control circuit 4 to ensure that the D line is scanned. The number D read out from the storage tube $CR_1$ via the reading unit 6 is fed to the adding unit associated with the accumulator storage tube via a gate 15 so that the number D is written into the accumulator. The time-base sweep for $CR_2$ is arranged to commence at the normal time, i. e. $p_{44}$, so that if $n$ had been 0, that is the first digit in R was a "1," the second sweep produced by the multiplier time-base unit 3 would have commenced at $p_{44}$ and the number D would have been written entirely upon the first (least significant) line on $CR_2$. The gate circuit 8 in the regenerative loop of $CR_1$ must be activated, so that regeneration occurs when the D line is scanned, and the gate circuit 15 must be conditioned to feed the read output from unit 1 to the adder 14 in the accumulator regenerative loop only when the D line is being scanned. Gates 8 and 15 are thus controlled by voltage waves $M_1$ and $Y_R$ which, as will be explained hereinafter, cause the gates to pass signals only when the D line is being scanned during active multiplication.

If $n$ is not equal to 0 the second sweep applied to $CR_1$ will occupy a time divided between adjacent beats of the accumulator storage tube operation and a five-digit pause must therefore be introduced into this second run-down corresponding with the flyback and black-out period of the accumulator storage tube. At the end of the full 45 digit period from the commencement of run-down of the second sweep on $CR_1$ the time-base waveform is caused to fly back and the time base generator to remain static until retriggered at $p_{41}$ to commence the second scan of the R line prior to commencement of the Action 2 beat of the accumulator cycle. This sweep continues until the first "1" digit in the stored information (the second "1" digit in the original number R) is encountered, when the same sequence of events as is described above is repeated, the time-base waveform flying back and the time-base generator being re-triggered two inter-digit periods later to scan the D line and so result in feeding to the accumulator the further time-displaced version of the number D required to perform the second step in the process of multiplication by repeated addition. The sequence of events is then repeated again once for every remaining "1" digit in the number R until the process of multiplication is completed.

The operation of the multiplier circuit outlined above will now be considered in greater detail.

When employed in a computing machine the multiplier arrangements may be quiescent when the multplier is not being employed or during the preliminary stages of multiplication when the numbers R and D are being written into the appropriate lines on $CR_1$. The circuit is stated to be multiplying when the actual process of multiplication is proceeding.

When a multiplication is to be effected the first problem is to load the numbers R and D into the multiplier and then cause the multiplication operation to commence. The process must then be caused to proceed until the multiplication is completed, when it must be stopped automatically. In the type of computing machine in which the multiplier may be employed, all operations are controlled by instructions and an instruction is normally completed in a "bar" comprising four beats, that is two scan and two action beats. As previously explained, in such a computing machine it is arranged that special completion signals or prepulses are generated and normally released to the control circuits of the machine at the end of every four-beat bar, any operation in the machine which is not completed by the end of a 4-beat bar therefore necessitates the inhibition of a completion signal. The operation of loading one number D into the storage tube $CR_1$ of the multiplier may be treated as the obeying of a normal instruction by an associated machine and can be effected in a single 4-beat bar. The loading of the second number R into a machine is the preliminary step to the commencement of the multiplying operation and it is therefore necessary to inhibit the release of a prepulse when the loading of the number R into $CR_1$ is completed, and there-after until the multiplication process is completed. During non-multiplying operation and also during quiescent operation while the number D is being written in, the time-base and Y-shift circuits 3 and 4 of $CR_1$ are arranged to scan the D line with normal time bases which are synchronous with the time bases applied to the accumulator and to the main storage units of any associated machine.

In the multiplier the digits of the multiplier R are all reduced to zero during the course of multiplication and it is not necessary to regenerate the number stored on the R line of the multiplier storage tube $CR_1$ after the end of multiplication. On the other hand, the form in which the multiplicand is stored remains unchanged throughout multiplication, and it is convenient to regenerate it after the end of multiplication so that it can be used in a later multiplication, or to hold and regenerate it in the multiplier for some time before the multiplier (R) is fed in and multiplication is automatically commenced.

When two numbers are to be multiplied therefore, the multiplicand D is first loaded into the multiplier, the loading process occupying one bar if the multiplier is included in a machine of the type referred to, and being effected by a single instruction which may be specified as *s*, D, as the number will be obtained from an address in a main store S, which is not shown. The commencement of this bar is initiated by a completion signal derived from the previous operation performed in the computing machine and is also terminated by a completion signal which will cause the next bar S1, A1, etc., which in general is concerned with the transference of the number R into the multiplier, to commence. Operations in other parts of the computing machine may intervene between the feeding of D and the feeding of R to the multiplier, and also the number D may be retained in the multiplier for multiplication by a succession of different R numbers so that the sequence of operations may be varied as desired by the programming of the computing machine which incorporates the multiplier. For the purpose of the present description it will be assumed that writing in of the second number R follows immediately upon the writing in of number D.

It is convenient, if the number D is negative, and if, as explained hereinafter it is to be decomplemented, that in the first scan beat (S1 of the next bar) following the completion of the writing in of D the number D should be complemented instead of being simply regenerated.

When D is written in and a completion signal is given at the end of A2 a second bar commences which is concerned with the transference of R from the main store of the machine to the R line of the multiplier. This process is again controlled by a separate instruction *s*,R, and during the first three beats of this bar S1, A1 and S2, the D line of $CR_1$ is regenerated normally as these beats are occupied with the selection of the second instruction and the setting-up of the appropriate control circuits in the associated machine. During the fourth beat A2 of this second bar the number R is written into the R line of $CR_1$, so that an appropriate Y-deflection has to be imposed upon $CR_1$ commencing at the beginning of A2. During the next beat (a scan beat) complementing of the number R may be carried out if required. The completion signal which would normally be released at the end of A2 must of course be suppressed until the multiplication process is completed as this process now proceeds automatically without further instruction.

It will be obvious that if the multiplier is used as an isolated unit the processes of writing in the factors D and R will not conform to a particular machine rhythm and the numbers could be fed in by manual switching arrangements such as those described in the aforesaid copending U. S. application, Serial No. 165,434, or from any suitable dynamic source synchronised to the main time-base rhythm of the multiplier storage unit 1 (which is the same as the standard time base rhythm employed in the accumulator 2) during the quiescent or non-multiplying phases of operation. The static control voltages which are obtained from the staticised instructions in an associated machine would be supplied in obvious fashion by suitably switched potential sources.

Fig. 4 indicates, against a time scale of beat intervals and p. pulses, various waveforms relevant to the consideration in detail of the operation of the multiplier. Fig. 4 (*a*) represents the standard time-base waveform applied to the accumulator and Fig. 4 (*b*) represents the time-base waveform which has to be generated by the multiplier time base (unit 3 of Fig. 3) during quiescent and multiplying operations. The first four beats S1—A2 are occupied with the carrying out of the instruction *s*,D which results in the multiplicand (D) being written into the D line of the multiplier storage tube during the A2 beat and the succeeding bar S1—A*n* is concerned with the writing into the R line of the multiplier (R) and the subsequent multiplication process. Fig. 4 (*c*) represents the multiplier tube Y-shift waveform which has to be generated by the multiplier Y-shift generator 4 (Fig. 3).

The Y-shift causes change-over from the scanning of the R line at the beginning of beat A2 when the number R is first written into the R line. The Y-deflection then remains in that condition during beat S3 (when R may be complemented) and is reversed to the condition in which the D line is scanned when the first "1" digit is encountered when scanning the R line during beat A3. It will be noticed that all scans S1, A1 . . . S3 commence at the back edge of $p_{44}$. whereas the scans of the R line during beats A3, A4 etc. including beat A*n* (when no "1" digit is found) all commence at the back edges of $p_{41}$.

The suppression of the completion signals necessary to enable the multiplication process to proceed unhindered is obtained by means of two two-state trigger circuits which comprises the control unit 9, Fig. 3. The F trigger circuit 16 produces a first wave $F_R$ Fig. 4 (*d*) which is employed to suppress the completion signal which would otherwise occur at the end of beat A2 in the second bar, while the M trigger circuit 17 produces a second wave $M_0$ Fig. 4 (*e*) which suppresses the completion signals thereafter until an end-of-multiplication signal is produced. The F trigger circuit 16 is triggered by a signal derived from the instruction statiscisor in the associated computing machine. When the instruction which results in the transference of the number R from the store to the multiplier cathode ray tube $CR_1$ is staticised during the beat S2, certain digits in the instruction result in the signal from a portion of the staticisor setting the F trigger circuit at the end of S2 and thus producing the wave *Fr* of Fig. 4 (*d*). At the end of the next scan beat S3 a re-setting signal is applied to the trigger circuit by the S3-gate waveform.

The M trigger circuit 17 produces the $M_0$ wave of Fig. 4 (*e*) and its inverted form M1. The M trigger circuit is triggered by a signal derived when the F trigger circuit is reset, so that the step in the $M_0$ wave coincides with the end of beat S3. The M trigger circuit is reset by the signal occurring at the end of the multiplication process via a coincidence or "and" gate 18 as will be explained. The $M_0$ wave is arranged to be positive-going in the non-multiplying condition, i. e. up to the end of S3 of Fig. 4 while the $M_1$ wave is positive during the active multiplication process. A further wave $M_0'$, Fig. 4 (*f*) is derived from the $M_0$ wave by delaying the back edge of the $M_0$ wave in a delay device 19 so that it coincides with the end of the last beat (A*n*). The M trigger circuit thus defines by its condition and the levels of its output-voltages the "mode" i. e. non-multiplying or multiplying of the multiplier circuit and is used to control the operation of the multiplier store time-base generator. The circuit releasing the completion signals in not described in detail as it is essentially part of the computing machine in which the multiplier may be operating, but the circuit is such that either the $F_R$ or the $M_0$ wave applied to suitable points in the circuit will inhibit the release of completion signals.

The multiplier time base generator 3 for producing the complex time-base wave of Fig. 4 (*b*) comprises a single time-base generator 20, the operation of which is controlled by the $R_0$ output voltage wave from an R trigger circuit 21 in the unit 10, the triggering and flyback of the time-base generator being effected by the triggering and re-setting of the R trigger circuit. These triggering and re-setting operations are controlled by four coincidence or "and" gates 22, 23, 24, and 25 and a 45-digit counter 26 and a two-digit counter or delay 27 fed with appropriate signals and $p$ pulses. The pause of the multiplier time-base sweep during the black-out periods of the accumulator time-base cycle, occurring during each scan of the D line while multiplication is in progress, is produced by applying to the time-base generator a suitable black-out pulse wave released by a fifth coincidence gate 28. The blackout of the multiplier storage tube $CR_1$ during pauses and flybacks of the multiplier time base is provided by feeding to the blackout input of the writing unit 7 by multiplier blackout wave consisting of the combined pause waveform from gate 28 and the output voltage $R_1$ from the R trigger circuit which has the appropriate polarity while the R trigger circuit is causing the multiplier time-base generator to fly back or wait.

The detailed operation of the circuit of the time-base control unit 10 and the time-base unit 3 is as follows:

During quiescent operation, i. e. when the multiplier is not in use and also when the numbers R and D are being written into $CR_1$, the coincidence gates 23, 25 and 28 are inoperative as the $M_0$ wave applied to them is positive, while the coincidence gates 22 and 24 are operative as the $M_1$ wave applied to them is negative. The R trigger circuit is thus triggered by the back edge of pulse $p_{44}$ applied to coincidence gate 22 and is reset by the back edge of pulse $p_{39}$ fed to coincidence gate 24. The time-base generator 20, controlled by the $R_0$ output of the R trigger circuit, is thus caused to produce the normal time-base wave in step with the time-base applied to the accumulator tube $CR_2$, as indicated in Fig. 4 (*b*) for the first 9 beats S1—S3.

The multiplication operation commences at the beginning of beat A3 of Fig. 4. At the end of the preceding beat S3 the M trigger circuit 17 has been triggered and therefore the coincidence gates 22 and 24 are rendered inoperative while the coincidence gates 23, 25 and 28 are made operative. The R trigger circuit is then triggered by the back edge of $p_{41}$ fed via the gate 23, and although pulse $p_{41}$ is passed by the gate 23 during both action and scan periods, only the pulse $p_{41}$ occurring near the commencement of action periods is effective, as during the intervening beats the R trigger circuit is already triggered. When the R trigger circuit is triggered by $p_{41}$ the time-base generator 20 commences to produce the time-base run-down scanning the R line and the read output obtained from the reading unit 6 of the regenerative loop associated with the multiplier storage tube $CR_1$ is fed to the gate 25. The first "1" digit encountered in the number R passes through the gate 25 and resets the R trigger circuit so that the time-base voltage waveform flies back immediately. The gate 25 has also applied to it the inverse, referred to as $Y_D$, of the multiplier Y-shift waveform of Fig. 4 (*c*) which controls the Y-deflection selecting the R or D line, so that the gate 25 only releases a "1" digit to reset the trigger circuit when the R line is being scanned after the commencement of active multiplication. "1" digits appearing in the read output from the multiplier tube $CR_1$ during the writing into the accumulator of the number R are thus ineffective. The "1" digit output from the gate 25 is also fed through the two-digit delay unit 27 to trigger the R trigger circuit so that two digit intervals after the flyback of the time-base waveform produced by the "1" digit in R, the R trigger circuit is again triggered and the scanning of the D line commences, the appropriate Y-shift having been applied to $CR_1$.

This scan of the D line must occupy the full 45 digit periods of the accumulator time base repetition cycle as it embraces the 5-digit flyback interval occurring between sweeps applied to the accumulator tube $CR_2$. The control of the length of this scan of the D line is effected by the 45-digit counter circuit 26 which counts 45 periods of an applied dash waveform after it is conditioned to commence counting by the co-incident application via a coincidence gate 29 of three positive inputs, the $M_1$ wave, the $Y_D$ wave and the $R_1$ output wave derived from the R trigger circuit. These three waves are all positive only when the sweep on the multiplier tube $CR_1$ is applied to the D line during active multiplication. The 45-digit counter produced a rectangular wave 45 digit repetition periods long and the back edge of this wave is used to reset the R trigger circuit and to cause flyback of the time-base voltage waveform. The cycle of operations then repeats with the triggering of the R trigger circuit by $p_{41}$ and the cyclic repetition continues until no "1" digit is encountered during a complete run-down of the time base scanning the line R. As explained hereinafter the failure to find the "1" digit during a whole scan of the R line may be employed to control the release of a completion signal or the end of multiplication signal.

The pause in the run-down of the time-base wave when scanning the D line during the fly-back interval $p_{39}$ to $p_{44}$ is controlled by feeding to an appropriate point of the time-base generator circuit 20 (e. g. the integrated voltage in a Miller circuit) the black-out pulse associated with the accumulator time-base wave. The blackout waveform is therefore fed via the coincidence gate 28 which is conditioned by the $M_0$ wave and also by the halver wave $H_A$, which is positive-going during action beats and negative-going during scan beats of the accumulator cycle. The coincidence gate 28 thus ensures that no pause pulse is applied to the time base generator 20 until the active multiplication process has commenced and also that no pulse can be applied during the action periods of active multiplication when the R line of the tube $CR_1$ is being scanned.

The Y-deflection waveform $Y_D$ or $Y_R$, Fig. 4 (*c*), which has to be applied to the multiplier tubes $CR_1$, is generated by a Y trigger circuit 30 which, together with a coincidence gate 31, forms the unit 4 of Fig. 3. This trigger circuit, which is arranged to be reset at the commencement of operations to the condition in which the D line is scanned, is triggered at the end of beat S2 of the second bar (see Fig. 4) into the condition in which the output wave $Y_D$ causes the R line to be scanned. This triggering is effected by the wave derived from the instruction staticisor and which may also be employed to trigger the F trigger circuit 16. The Y trigger circuit is thereafter caused to reverse its condition, whatever its existing state, whenever the time-base voltage waveform produced by the time-base generator 3 flies back during multiplication. This is effected by feeding the wave $R_0$ from the R trigger circuit 21 through the gate 31, which is controlled by the $M_1$ wave so that this reversal can only occur during the active multiplication process. The output from the gate may conveniently be applied to the anodes of both valves of the trigger circuit in order to effect reversal irrespective of the state of the trigger.

At the end of the multiplication process the Y trigger circuit is finally reset by the wave $M_0'$ to the condition in which the D line of $CR_1$ is scanned. The edge of this wave which causes the resetting occurs, as will be explained below, 3 digits later than the scanning of the last digit in the last line to be scanned. The re-setting of the Y trigger circuit may also be affected by the ordinary completion signals or prepulses available in the computing machine embodying the multiplier.

This facility of re-setting by completion signals from an associated machine may be provided as the action of setting the computing machine into operation automatically releases a completion signal to all relevant parts of the machine and the possibility of starting up a multiplication sequence with the R line being scanned instead of the D line, due to the random initial condition of the Y trigger circuit on switching on, is thereby prevented.

The conditions which determine that the multiplication has been completed and the means whereby a completion signal is produced are as follows. During the action beat A$n$, after the action beat during which the R line was scanned to encounter the last "1" digit in the number R, the time-base waveform applied to the tube $CR_1$ commences to scan the R line in coincidence with $p_{41}$. This scan continues and the last digit, which is necessarily now a "0" is scanned in coincidence with $p_{36}$. The scan then continues along the R line past the part upon which was originally recorded the number R, and the fact that the time base has not been caused to flyback by the time of the next $p$ pulse, $p_{37}$, indicates that the last "1" in R has already been utilised and that multiplication is complete. A coincidence gate 18 in the unit 9 is therefore fed with $p_{37}$ pulses, a version of the multiplier Y-shift waveform of appropriate polarity (the $Y_D$ waveform) and also the halver wave Hs, which is positive-going during scan beats and negative-going during action beats, so that a $p_{37}$ pulse is released only when a complete scan of the R line (more precisely that section of the R line upon which the number R was originally recorded) has been made without flyback of the time-base having been produced by the existence of a "1" digit. The effect of the halver wave Hs is to prevent release of the $p_{37}$ pulse during any scan beats in which the R line may be scanned. The $p_{37}$ pulse released by the gate is thus effectively the end of multiplication signal and is used to reset the M trigger circuit 17 which thus permits the next prepulse signal generated in the computing system to be released.

In order that the multiplier arrangement of the invention may operate in manner which allows each factor to be handled as a positive number (with a consequent saving in time as previously explained) and which causes the signs of the factors to be taken into account in determining the sign of the product, certain modifications and additions have to be made to the arrangement of Fig. 3. Fig. 5 shows in block schematic form the additional elements and also those portions of the arrangement of Fig. 3 which are to be modified to deal with the additional functions. Units 3, 4, 9 and 10 of Fig. 3 are not shown in Fig. 5 as they require no modification.

Indicated in Fig. 5 is a portion of the regenerative loop of the multiplier cathode-ray-tube storage tube (unit 1) showing how a complement converting unit 34 is included in the loop. A product-sign determining unit 33 is included, the function of which is to control the complement converter and also to control the inclusion, in the regenerative loop of a modified accumulator unit 2$a$, of the appropriate arithmetical unit, namely an adder 14$a$ or a subtractor 14$b$. The gate circuit 15 which feeds the read output from the multiplier cathode-ray storage tube to the accumulator is also shown.

It can be shown that, in binary notation, the process of obtaining the complement of a number is the same as that of decomplementing a complementary number, i. e. obtaining a number from its complement, and when numbers are expressed in serial form, the least significant digit first, the process resolves itself into the passage of the number unchanged until after the first "1" digit is encountered and the passage of the number thereafter through a "not" device which changes the value of each digit, from "0" to "1" and vice-versa. It will be apparent that if two negative numbers (complements) are to be multiplied together and they are decomplemented before the multiplication process, the fact that the numbers have been decomplemented will only affect the multiplication time and that the correct (positve) product will be obtained by feeding the partial products to the accumulator via an adding unit. Similarly, if only one factor in a multiplication is negative and the number is decomplemented before multiplication, it is obvious that in order to obtain the correct (negative) product the product obtained by addition of the partial products during multiplication would have to be complemented. This process is carried out directly in the modified form of the invention illustrated in Fig. 5 by the substitution of the subtracting unit 14$b$ for the adding unit 14$a$. The appropriate unit 14$a$ or 14$b$ is included in the regenerative loop of the accumulator by closure of the corresponding gate circuit 34 or 35 under the control of the product-sign determining unit.

The nature of the additional apparatus indicated in Fig. 5 is such that the modified multiplier may or may not take account of sign, as desired. Conventionally, when the multiplier operates in conjunction with a machine of the type referred to, the machine instructions $s$,D and $s$,R are such that the control voltages derived from the staticised instructions do not activate the product-sign unit 33 and the modified multiplier operates exactly as the simple version of Fig. 3. Special instructions, referred to as $s^1$,D and $s^1$,R are arranged so that when they are staticised the control voltages produced activate the unit 33 so that the multiplier takes account of sign. Those parts of the multiplier which are common to both Figs. 3 and 5 respond equally to the $s$,D and $s$,R and the $s^1$,D and $s^1$,R instructions.

The operation of the arrangement of Fig. 5 will now be considered in greater detail.

The complement converting unit 34 comprises essentially two parallel alternative paths provided by a gate circuit 37, and a gate circuit 38 preceded by a "not" device 36, which are inserted between the reading unit 6 of the multiplier regenerative loop and the gate circuit 8, which is employed to interrupt the regenerative loop during scanning of the R line to cause the "1" digits encountered to be regenerated as "0's." The gates 37 and 38 are controlled in opposition by a staticiser element, the complement trigger circuit 39. In the normal condition and during $s$,D and $s$,R operations the trigger circuit 39 is clamped in one condition by a voltage, from the product-sign unit 33, which holds the gate 37 in the condition to pass signals for regeneration unchanged. If the clamping voltage is removed by virtue of the fact that the product sign unit has detected that a number (D or R) written into the multiplier store during an A2 beat is a complement, the trigger circuit 39, which is fed on its triggering input with the read output from the multiplier store, is triggered by the first "1" digit encountered during the subsequent regeneration of the number D or R so that the conditions of gates 37 and 38 are reversed and the later digits of the number are regenerated via the "not" device 36.

The product-sign determining unit 33 has the following functions to perform:

1. To examine the value of the most significant digit of each incoming number written into the multiplier cathode-ray-tube during $s^1$,D and $s^1$,R operations.
2. To produce a voltage waveform which unclamps the complement trigger circuit 39 during the appropriate scan beat following the writing of a complement into the multiplier cathode-ray-tube.
3. To record the sign of the multiplicand (D) written in during an $s^1$,D operation until the multiplier (R) is fed in.
4. To determine the sign of the product and provide control potentials to activate the appropriate gate 34 or 35 in the accumulator regenerative loop.

The product-sign unit 33 comprises a sign-determining trigger circuit or staticisor element 40, a D trigger circuit or staticisor element 42 which records the sign of the multiplicand and the RD trigger circuit or staticisor element 45. The trigger circuit 40 has applied to its retriggering input the HS phase of the halver waveform, the negative-going edges of which will cause the circuit to assume (if it is not already in) the normal condition at the ends of scan beats. The output control voltage from 40 in the normal condition is such that the complement trigger circuit 39 is clamped and no complementing operation can take place. A triggering signal is applied to the element 40 via a coincidence gate circuit 41 to which is fed the write input signal (D or R)

which is being fed to the multiplier storage cathode-ray-tube during an A2 beat, the $p_{39}$ pulse and a control voltage from the instruction staticisor of an associated machine which is effective to condition the gate to pass signals only when $s^1$,D or $s^1$,R operations are being carried out. The occurrence of a "1" digit in the most significant position ($p_{39}$) of R or D thus triggers the staticisor element 40 into the condition which permits the complement converter to operate during the succeeding scan beat during which the number (R or D) would otherwise be normally regenerated.

The sign of the multiplicand is given by the state of the staticisor element 42. The triggering channels of this staticisor via coincidence gates 43, 44 are normally disconnected so that its state cannot be changed; but, for $s$,D and $s^1$,D instructions, signals from the Instruction Staticisor of the associated machine connect the triggering channels during A2 and S1 or S3 beats. Immediately the triggering channels are connected the staticisor is set into the "positive" condition by the Inverted Action waveform fed to gate 44 and, if the incoming number is positive, it remains in this condition until the triggering channels are disconnected again. If the incoming number is negative and the instruction is $s'$,D the signal from the sign-determining trigger circuit 40 sets the D trigger circuit into the "negative" condition during S1 or S3. The sign of the multiplicand then remains recorded until the next $s$,D or $s'$,D operation.

The sign of the product is determined by the other staticisor element, the RD trigger circuit 45 which is normally disconnected from its triggering channels via gates 46, 47 in the same way as the D trigger circuit. In the case of instructions $s$,R and $s'$,R, a signal from the instruction staticisor connects the triggering channels to the D trigger circuit during beat A2. The staticisor is immediately set into the same condition—"positive" or "negative"—as the D trigger circuit. At the end of beat A2 it is disconnected from the D trigger circuit and if the multiplier is positive no further changes occur, the sign of the product then being the same as that of the multiplicand. If the multiplier (R) is negative, however, a signal from the sign-determining trigger circuit 40 is applied to the RD trigger circuit and reverses its condition. This gives the correct sign of the product i. e. opposite to the sign of the multiplicand.

Output control voltages are taken from the RD trigger circuit via gates 48, 49, controlled by the $M_0'$ wave so that they are restricted to the period of multiplication, and are sent to the accumulator adder and subtracter gates 34 and 35. The effect of these signals is to include either the adder or the subtracter in the accumulator regenerative loop according to the required sign of the product.

The sequence of operations occurring during three typical bars, bars 1, 2 and 3, of the operation of the modified multiplier of Fig. 5 will now be described with reference to Fig. 6 which illustrates, against a time scale of beats or minor cycles, and p. pulses, the salient voltage waveforms involved. In Fig. 6, (*a*) illustrates a typical signal derived from the instruction staticisor of an associated machine, (*b*) illustrates the erasing voltage waveform fed to the reading unit of the multiplier storage tube regenerative loop (the suppressor grid potential of the first valve in the reading unit), (*c*) illustrates the $M_1$ waveform, (*d*) illustrates the multiplier cathode-ray-tube time-base deflection waveform, (*e*) illustrates the Y-shift waveform applied to the multiplier cathode-ray-tube (*f*) illustrates the complement trigger clamping waveform derived from the sign-determining trigger circuit 40, (*g*) illustrates the waveform controlling the triggering paths to the D trigger circuit, (*h*) represents the state of the D trigger circuit, (*i*) illustrates the signal controlling the triggering paths from the D to the RD trigger circuit, and finally (*j*) represents the state of the RD trigger circuit.

During the first bar, Bar 1, a non-multiplier operation is being performed. The time base, which is in the quiescent mode throughout, is triggered at time $p_{44}$ and reset at time $p_{39}$ in each beat. The Y-shift generator is in the "multiplicand" state. The complement trigger circuit is clamped so that numbers pass unchanged through the complement converter; and the D trigger circuit records the sign of the multiplicand (assumed in this case to be negative). During A1 and A2 of this bar, the action of the writing unit in the regenerative loop of the multiplier store cathode-ray-tube is suppressed by the selection blackout which is provided by the action waveform so that the stored number remains unchanged even though the erase input (the suppressor grid waveform of the first valve in the reading unit 6) is stimulated.

During the second bar, Bar 2, the operation is $s'$,D, and it will be supposed that the incoming multiplicand is a complement. Operation is exactly the same as in Bar 1 up to the beginning of A2; at this instant the triggering channels of the D trigger are connected and it is set into the "positive" condition so that the sign of the old multiplicand, which will not be required again, is lost. During A2 the erase input of the multiplier gate-circuit is stimulated to prevent regeneration and the new multiplicand, which is fed during this beat to the write input, is recorded in its place on the multiplicand line of the store, the staticised $s'$D instruction being effective to prevent the selection blackout (action) waveform blacking out the multiplier cathode-ray-tube during A2. As the last and most significant digit of the multiplicand is fed to the write input its value is examined by the gate 41 and, found to be a "1", since the incoming number is a complement. This has the effect of unclamping the complement converter until the end of S3 (S1 of Bar 3) so that the new multiplicand is decomplemented as it is regenerated during S3. The D trigger is set into the "negative" condition during S3 by the complement converter unclamping signal, so that it records the sign of the new multiplicand. At the end of S3 the complement converter is reclamped and the operation is complete.

It will be observed from Fig. 6 (*j*) that the RD trigger circuit changes its condition at the end of S3. This has no effect on its condition during the following multiplication.

During the third bar, Bar 3, the operation is $s'$,R and it is assumed that the multiplier R is $2^{10}+2^{15}$ which is represented by two non-zero digits only. Operation is the same as in Bar 1 up to beginning of A2; at this instant the RD trigger circuit is connected to the D trigger circuit and set into the same condition i. e. "negative." The Y-shift generator also changes its state so that the "multiplier" line of the store is scanned during A2. During A2 the erase terminal of the multiplier regenerative loop is stimulated to prevent regeneration of any spurious signals that may be picked up from the multiplier line which is now being scanned for the first time after an indefinitely long period. At the same time the new multiplier is fed to the write input of the regenerative loop and is recorded by the store. The incoming number is positive and its most significant digit is "0." Thus the complement converter remains clamped during S3 and the multiplier is regenerated unchanged during this beat. If the new multiplier had been negative the complement converter would have been unclamped as shown by the dotted line in Fig. 6 (*f*) and the multiplier (R) would have been complemented during S3. In addition the RD trigger circuit which is in the "negative" condition would have had its condition reversed at the end of S3.

At the beginning of A3, multiplication starts. The time-base—still scanning the multiplier line—is triggered 3 digit periods early at the back edge of $p_{41}$. Thus the first digit of the multiplier is scanned during pulse $p_{42}$ and so on, the $n$th digit being scanned during pulse $p_n-4$. The first non-zero digit of the multiplier is the 11th, representing $2^{10}$. This is scanned and regenerated as "0" during pulse $p_7$. The time-base generator is therefore reset at the end of $p_7$ and the Y-shift generator changes to the multiplicand condition. Two digit periods later, the back edge of $p_9$, the time-base generator is triggered again and proceeds to scan the multiplicand line. Time $p_9$ is 10 digit periods later than the normal time ($p_{44}$) for triggering the time-base, so that the read output signal from the regenerative loop corresponds to the multiplicand multiplied by $2^{10}$. This signal is sent to the accumulator where it is subtracted from the number already existing there (zero if a simple product is being formed). The multiplicand scan is paused during the black out period at the beginning of S4 when the accumulator cannot accept an input and is finally completed at time $p_9$ of S4, when the time-base waveform flies back and the Y-shift generator changes to the "multiplier" condition.

The same procedure is repeated in A4 and S5 to form the second and last term of the summation for the product. In this case the first and only remaining non-zero digit ($2^{15}$) is found during pulse $p_{12}$ and the multiplicand scan begins at the back edge of $p_{14}$. This is 15 digit periods later than time $p_{44}$ so the read output signal corresponds to the multiplicand multiplied by $2^{15}$. This is sent to the accumulator and subtracted from its contents, giving the product.

At the beginning of A5 the time-base is triggered again at the back edge of $p_{41}$ and scans the multiplier line searching for "1's." But now there are none left and the sweep is completed, the last digit being scanned during pulse $p_{36}$. At time $p_{37}$ the fact that the multiplier line is still being scanned is used to terminate multiplication. The time-base waveform flies back at the back edge of $p_{39}$, the Y-shift generator changes to the "multiplicand" condition, and the M trigger circuit changes to the quiescent condition. After this operation is the same as in Bar 1.

*Detailed operation of circuits*

Figure 8:
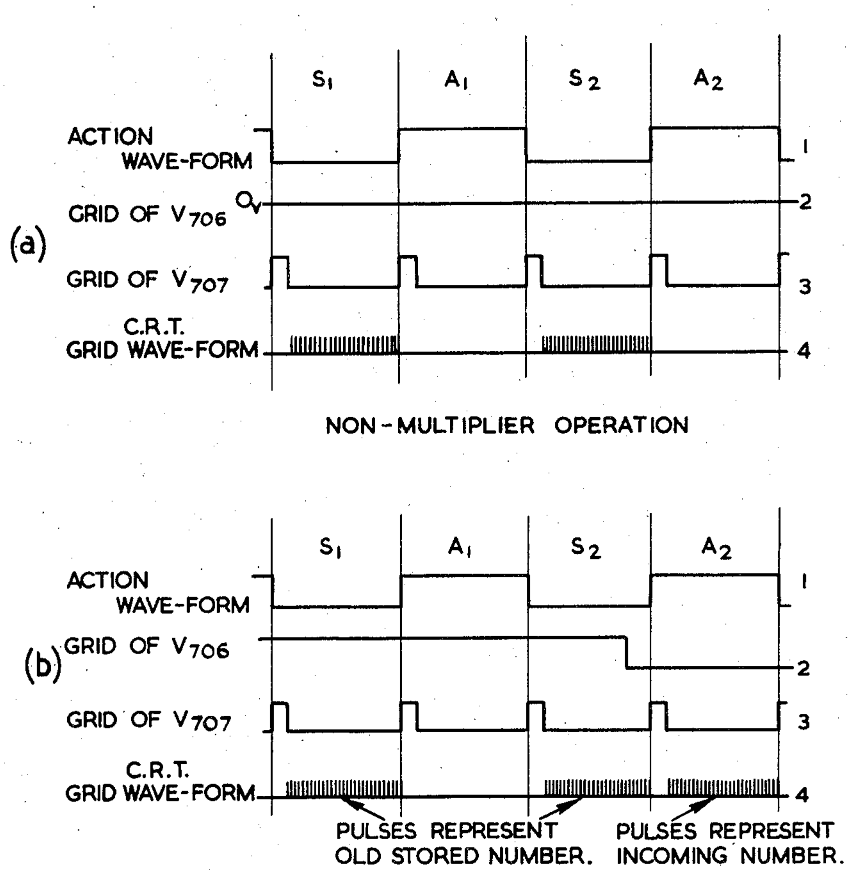

The regenerative loop circuit for the multiplier tube will now be described with reference to Figs. 7*a*, 7*b* and 8.

The terminals shown in Figs. 7*a* and 7*b* are connected to the following points or fed with the following control signals:

T701—The output of amplifier 5 (Fig. 3 or 5)
T702—Strobe pulse source
T703—Erase or suppressor control voltage derived from the instruction staticisor of an associated machine
T704—Read output
T705—Output from the gate circuit 8 of Fig. 3 or 5
T706—Write input source
T707—Dot waveform source
T708—Inputs from the instruction staticisor of the associated machine
T709—Action waveform source
T710—Multiplier blackout waveform
T711—Cathode-ray-tube grid (multiplier)

In Fig. 8*a* the waveforms represent the following voltages appearing in the circuit of Fig. 7.

| | |
|---|---|
| 1. Action waveform | During non-multiplier operation |
| 2. Voltage on the grid of V706 | |
| 3. Voltage on the grid of V707 | |
| " The output voltage to the cathode-ray-tube grid | |

In Fig. 8*b* the waveforms represent the same voltages in the circuit of Fig. 7 during muultiplier operation.

The read and write units comprising the regenerative loop differ from those described in a paper by F. C. Williams and T. Kilburn entitled "A storage system for use with binary-digital computing machines." (Proc. I. E. E. 1949, vol. 96, part III, p. 81) in the following respects:

1. The circuit is divided into two parts, between the cathode of V704 and R719, so that the gate circuit 8 (Fig. 3 or 5) and the complement converter can be inserted in the regenerative loop.

2. V702 and V703 with their associated components are added to increase the amplitude of the signal appearing at the read output terminal T704. This additional gain is necessary as the standard circuit described in the paper referred to above provides a signal which is not large enough, when differentiated, to operate the trigger in the complement converter and to initiate operation of the 2-digit counter with reliability.

3. V706 and V707 are added in parallel with V705 to provide the selection and multiplier blackout facilities. When either of these valves is conducting to its anode, the combined anode potential will be unable to rise and the cathode-ray-tube electron-beam will not be turned on.

The control-grid of V706 is always turned on unless the mean level of the four instruction staticisor output signals, applied to its grid through high resistors from terminals T708 is negative; this occurs during A2, S3 and part of S2 for operations *s*,D, *s*'D, *s*,R, and *s*'R, in which numbers are required to be written into the multiplier store. The suppressor grid of V706 is always turned off except during A1 and A2 by the action waveform. Thus the effect of V706 is to prevent the electron-beam of the cathode-ray-tube from being turned on during A1 and A2, except that during any one of the four operations mentioned above the beam is turned on during A2. It will be appreciated that the combined input on terminals T708, T709 is effectively the "selection blackout" of Fig. 3 or 5.

V707 is turned on by positive excursions of the multiplier blackout waveform; its effect is to prevent the electron-beam from being turned on during action-to-scan blackout periods of the main (accumulator) time base when the multiplier time base is pausing.

Fig. 8*a* waveforms relate to regeneration of the multiplicand during a non-multiplier operation. The suppressor grid of V701 is cut off by a suitable erase waveform during A1 and A2 but the stored number is unaffected, since the cathode-ray-tube grid pulses are suppressed by V706 during these beats. The same remarks apply to A1 of Fig. 8*b* which represents waveforms during a multiplier operation, say *s*,D. During A2 the cathode-ray-tube grid wave form is not suppressed and the number sent to the write input, terminal T706, of the circuit of Fig. 7*b* is written into the store. No signal can reach the second part of the circuit Fig. 7*b* from the first part (Fig. 7*a*) since the suppressor grid of V701 is cut off.

The F and M trigger circuits of Fig. 3 will now be described with reference to Fig. 9 and the explanatory voltage waveform diagrams of Fig. 10. This part of the circuit consists essentially of two staticisor elements. Its function is to detect the instructions which call for multiplication, and to signal to the other circuits when multiplication is in progress.

Figure 9:
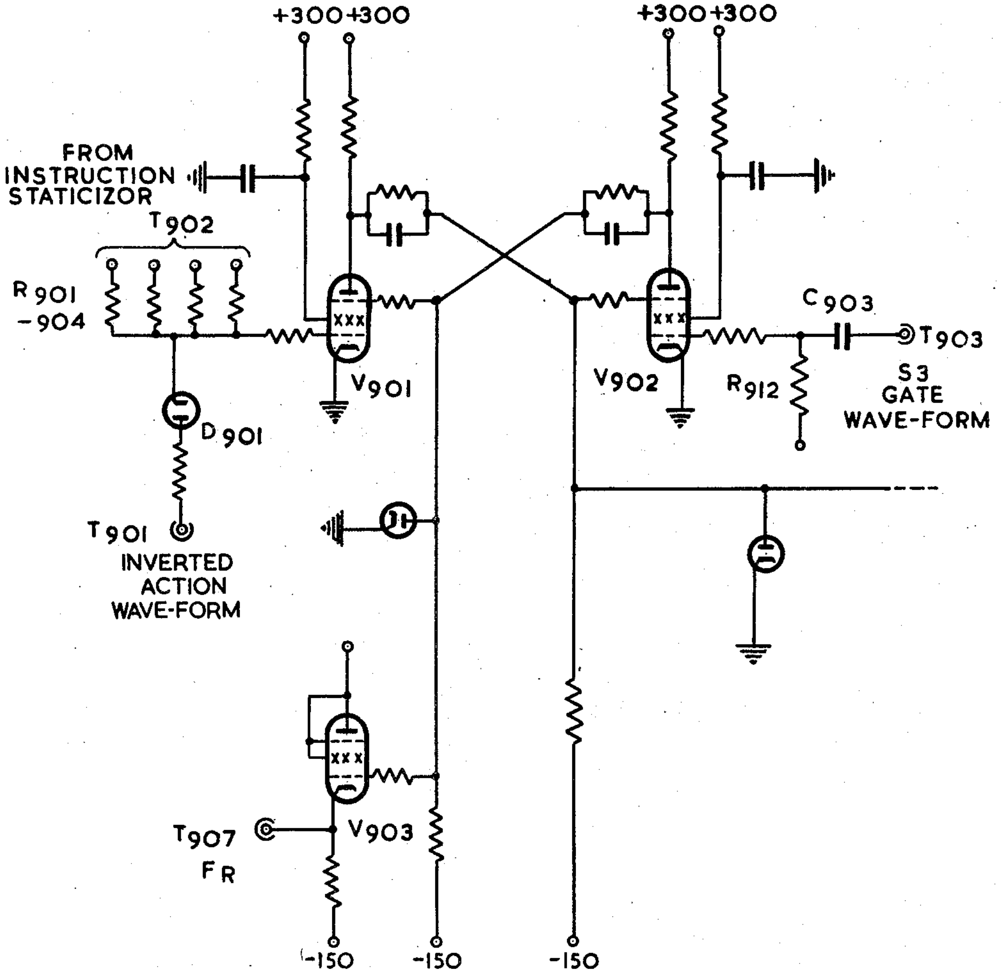
Figure 9:
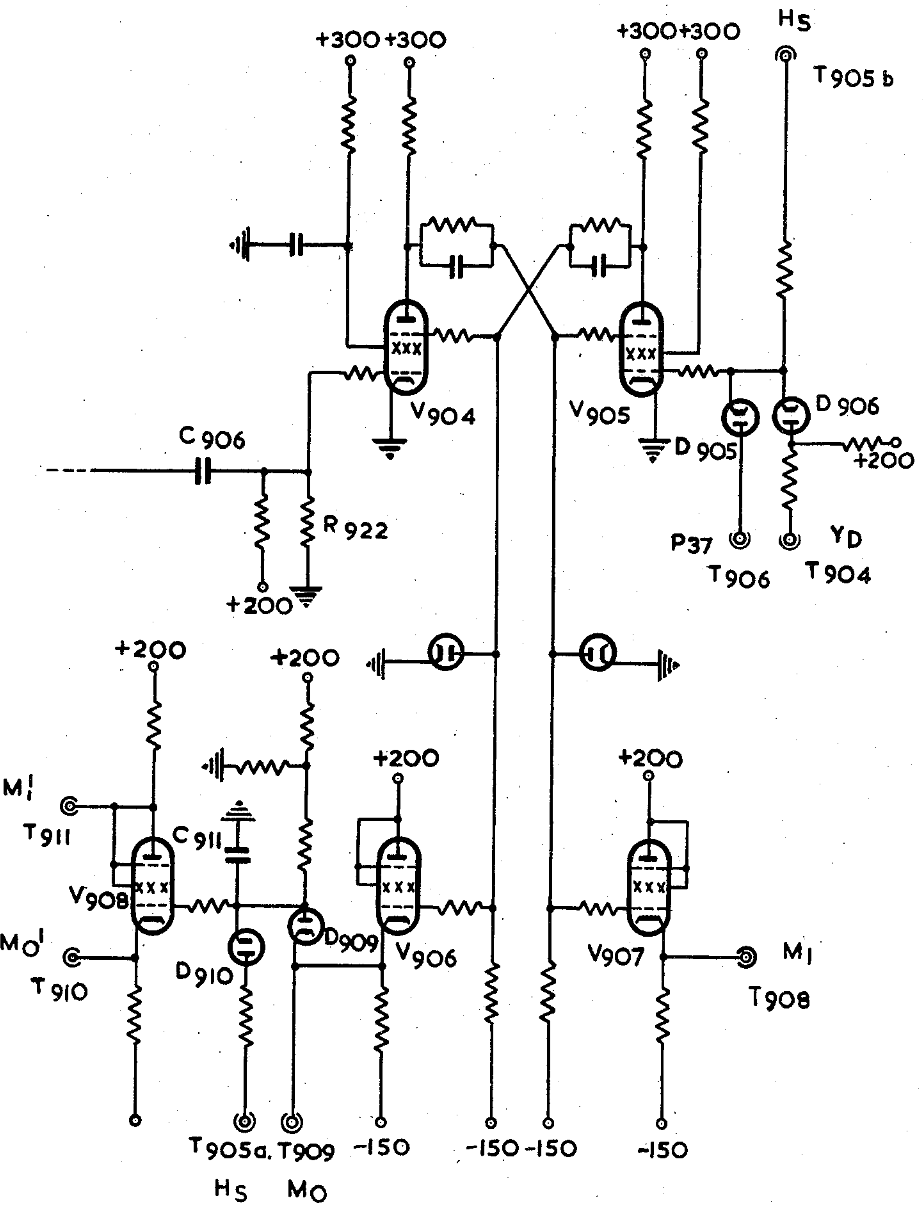
Figure 10:
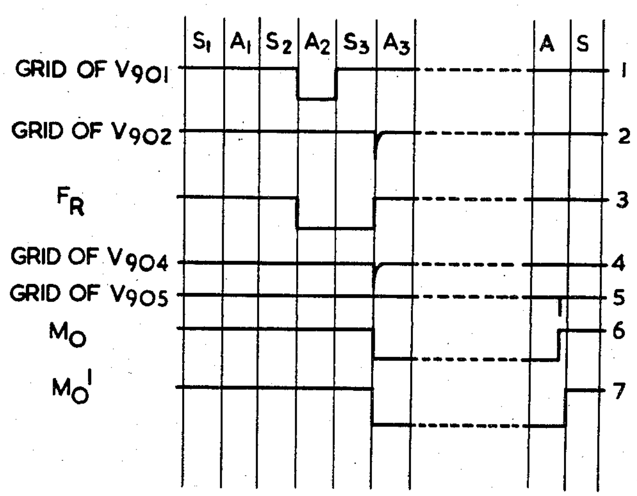

In Fig. 9 the voltage waveforms applied to the terminals are as follows:

T901—Inverted action waveform
T902—Inputs from instruction staticisor
T903—The S3 gate waveform
T904—The $Y_D$ waveform from the Y-shift generator
T905*a* and *b*—The halver ($H_s$) waveform
T906—The $p_{37}$ pulse While the following output voltage waveforms are derived:

T907—The $F_R$ output waveform
T908—The $M_I$ output waveform
T909—$M_0$ output waveform
T910—The $M_0'$ output waveform
T911—The $M_I1$ output waveform In Fig. 10 the following voltages are represented.

1. The voltage at the grid of V901
2. The voltage at the grid of V902
3. The $F_R$ output voltage wave
4. The voltage at the grid of V904
5. The voltage at the grid of V905
6. The $M_0$ output voltage wave
7. The $M_01$ output voltage wave The control grid of V901 is connected through high resistors R901, R902, R903 and R904 to four of the outputs (T902) of the instruction staticisor, chosen so that their mean level is negative only when one of the instructions calling for multiplication—*s*,R or *s'*,R—is set up on the staticisor. The negative mean level becomes available at some time during S2 when the instruction is staticised but it is undesirable that any action should be taken until the blackout period at the beginning of A2. The diode D901 is therefore added to prevent the potential of the grid of V901 from falling below earth until the beginning of A2, when the inverted action waveform applied to the diode anode, goes negative. The F trigger circuit comprising V901 and V902, which is normally in the V902—off (quiescent) condition, is thus triggered into the opposite condition at the beginning of A2, if the instruction calls for multiplication. The trigger circuit is returned into the normal condition at the end of S3, by the back edge of the S-gate signal differentiated by C903 and R912. The suppressor voltage waveform of V901 is cathode-followed by V903, and forms the signal $F_R$, which is used to inhibit the production of a prepulse at the end of A2 in the associated machine. The suppressor waveform of V902 is differentiated by C906 and R922 and its negative back edge is used to trigger the M trigger circuit comprising valves V904, V905 into the "multiplying" condition at the end of S3. The M trigger circuit is returned into the "quiescent" condition when Hs and the anodes of D905 and D906 (fed with the $p_{37}$ and $Y_d$ waves) are all negative together. The suppressor waveforms of V904 and V905 are cathode-followed by V906 and V907 and form the signal waveforms $M_0$ and $M_1$ which are, in the "quiescent" condition, +3 and −65 v. respectively, and which interchange their levels during multiplication.

The condenser $C_{911}$ is charged to −65 v. during multiplication by current flowing from the $M_0$ output connection through $D_{909}$. When $M_0$ goes positive at the end of multiplication, $D_{909}$ cuts off and $C_{911}$ remains charged until the end of the action period, when it is discharged via $D_{910}$ by Hs, which goes positive at this time. The resulting potential across $C_{911}$ is cathode-followed by $V_{908}$ and forms the signal waveform $M_0'$. $V_{908}$ has a small anode load across which the signal $M_1'$ is developed.

The waveforms appearing at some of the more important points of the circuit, during an operation calling for multiplication, are given in Fig. 10. The beat A shown on the right is the first action beat after the last term of the summation for the product has been formed; during this beat the trigger circuit $V_{904}$, $V_{905}$ is reset into the "quiescent" condition.

The R trigger circuit will now be described in detail with reference to Figure 11 and the explanatory voltage waveform diagrams of Fig. 12.

Figure 11:
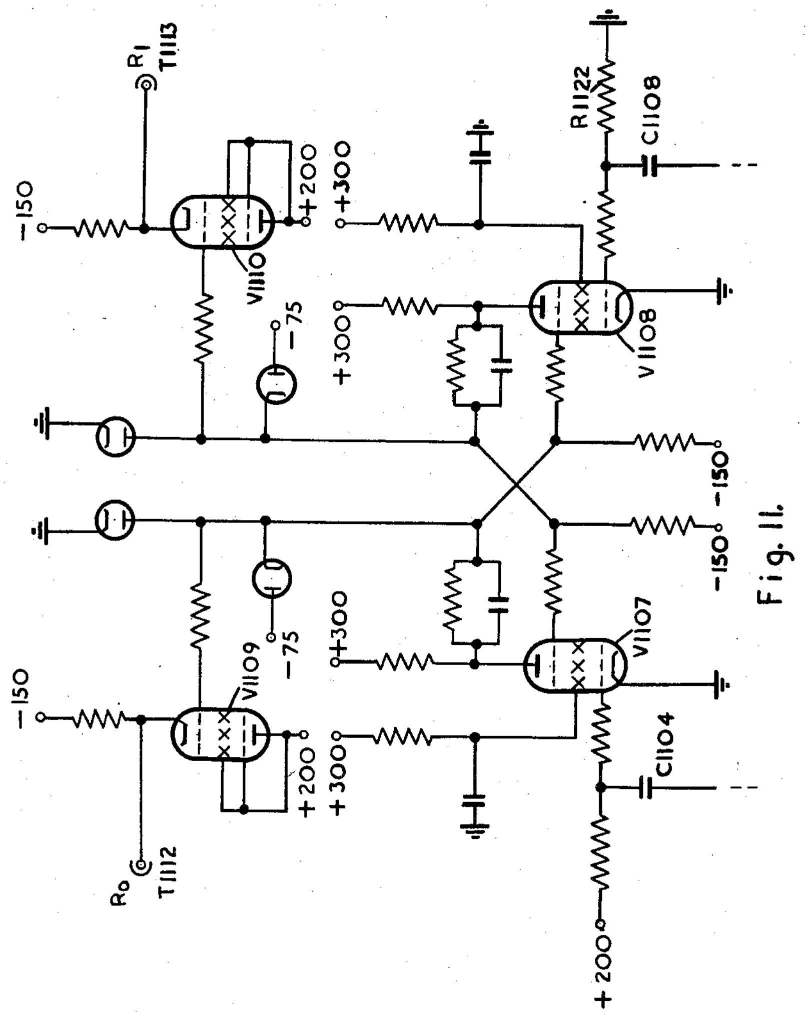
Figure 11:
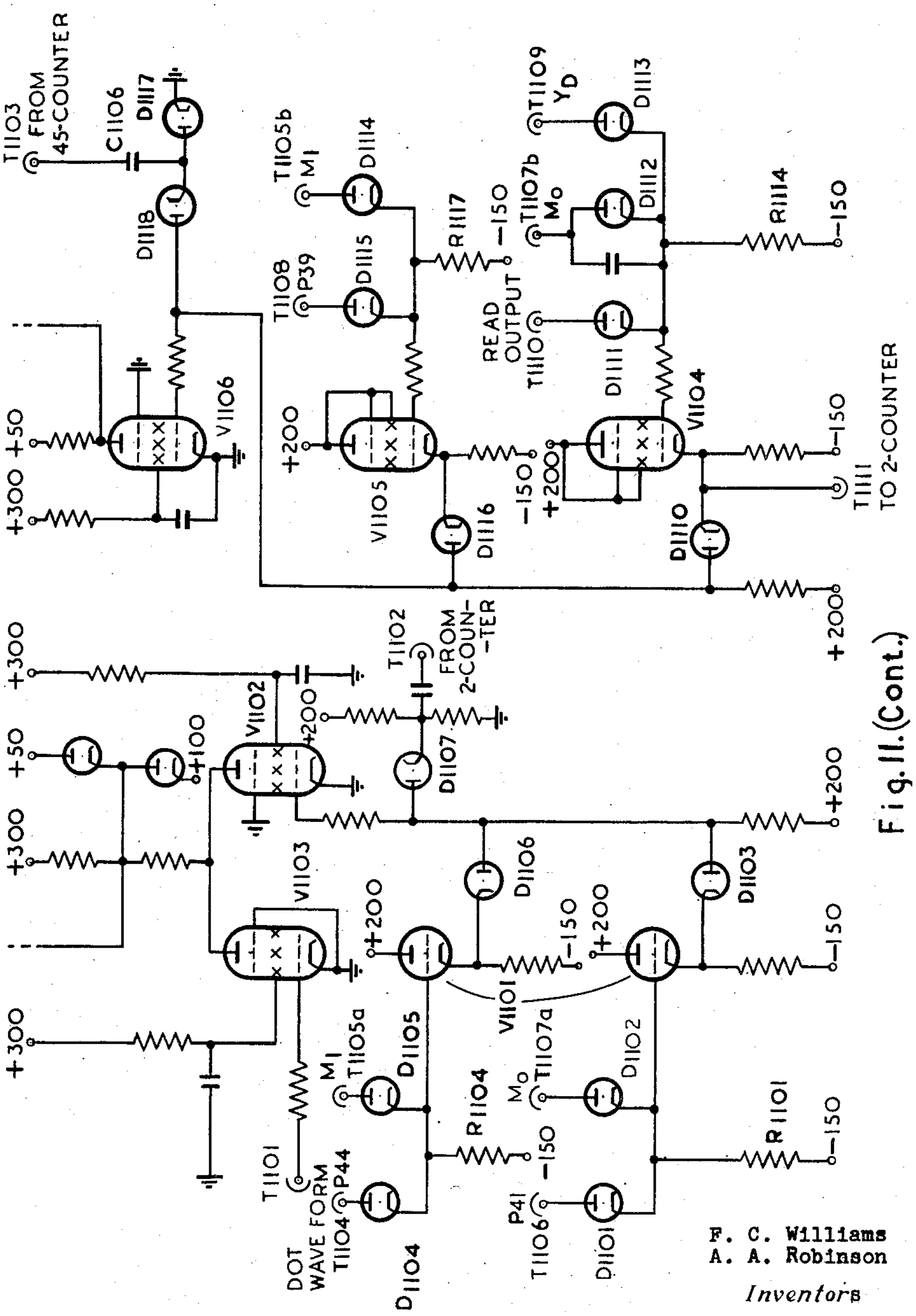
Figure 12:
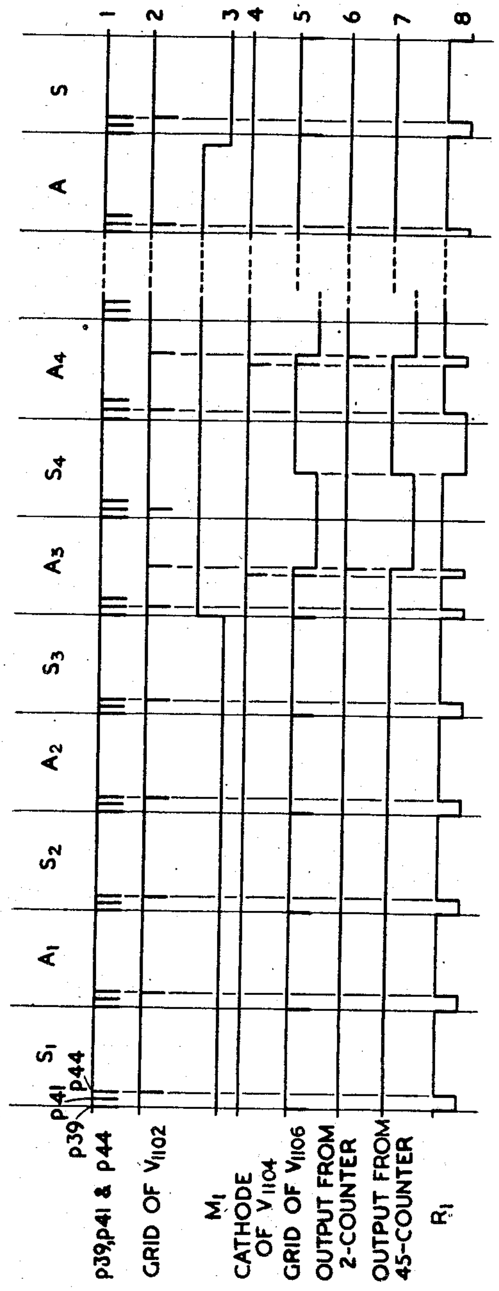

The voltages applied to terminals shown in Fig. 11 are as follows:

T1101—Dot waveform
T1102—Output from the 2-digit counter
T1103—Output from the 45-digit counter
T1104—The $p_{44}$ pulse
T1105*a* and *b*.—The $M_1$ waveform
T1106—The $p_{41}$ pulse
T1107*a* and *b*.—The $M_0$ waveform
T1108—The $p_{39}$ pulse
T1109—The $Y_D$ Y-deflection waveform
T1110—The read output from the multiplier cathode-ray tube regenerative loop.

and the output voltages derived are as follows:

T1111—The output (retriggering) pulse to the 2-digit counter
T1112—The $R_0$ output wave
T1113—The $R_1$ output wave The waveforms of Fig. 12 represent the following voltages 1. $P_{39}$, $P_{41}$ and $P_{44}$ pulses
2. Grid voltage of V1102
3. The $M_1$ waveform
4. Cathode voltage of V1104
5. Grid voltage of V1106
6. Output pulse from 2-digit counter
7. Output pulse from 45-digit counter
8. The $R_1$ waveform ($R_0$ is the inverse)

The function of this part of the multiplier is to determine the periods during which the multiplier storage cathode ray tube is scanned. The output waveforms $R_0$ and $R_1$ are −65 and 3 v. respectively during scanning periods and are interchanged during the intervening flyback and waiting periods. $R_0$ and $R_1$ are obtained by cathode-following in V1109 and V1110, the suppressor voltage waveforms of the actual R trigger circuit V1107, V1108 which is triggered into the "scan" and "waiting" conditions by the mechanisms described below.

The trigger circuit will be triggered into the "scan" condition by one of the following methods:

1. D1104, D1105 and R1104 form a coincidence gate for negative signals; so in the quiescent operation, when the $M_1$ waveform is at −65 v., $p_{44}$ passes through and is cathode-followed by one half of the double triode V1101 and then passes through D1106 to the control grid of V1102 which is heretofore cut off during pulse $p_{44}$. The anode of V1102 is connected in parallel with that of V1103 which is turned off during dot periods. Thus the combined anodes rise in potential at the beginning of $p_{44}$ and fall again at the end of the dot period when V1103 is turned on. The falling edge of the anode voltage waveform is differentiated by C1104 and cuts off the control grid of V1107 and sets the trigger circuit. V1103 is included to ensure that the circuit is triggered at definite instances which are unaffected by variations in the widths of the triggering pulses at the grid of V1102.

2. During multiplication $p_{41}$ passes through the coincidence gate, D1101, D1102 and R1101, and via D1103 to the grid of V1102. It is then used to trigger the circuit in the same way as $p_{44}$ as explained above.

3. An input from the 2-digit counter is applied to the grid of V1102 via D1107; it is used to trigger the circuit for the "multiplicand" scans during multiplication.

The trigger circuit may be triggered (reset) into the "waiting" condition by the following methods:

1. During quiescent operation $p_{39}$ passes through the coincidence gate D1114, D1115, R1117 and valve V1105 and is fed via D1116 to the grid of V1106 and cuts that valve off. The potential at the anode of V1106 rises, and falls again when V1106 is turned on again at the end of $p_{39}$. The falling edge is differentiated by C1108 and R1122 and cuts off the valve V1108 on its control grid, triggering the circuit.

2. During the "multiplier" scans of multiplication the first "1" recorded in the R line of the store appears as a negative pulse at the read output of the reading unit of the regenerative loop, passes through the coincidence gate, D1111, D1112, D1113, and R1114 and is cathode-followed by V1104. The resulting signal is sent to the 2-digit counter (unit 27 of Fig. 3) and also passed through D1110 to the control grid of V1106 and triggers the circuit.

3. The 45-digit counter (Unit 26 of Fig. 3) produces an output wave which goes negative during the "multiplicand" scans of multiplication. This voltage waveform is fed in via the condenser C1106 and is D. C.-restored by D1117 to produce a long (45 digit period) pulse, negative-going from earth potential, which passes through D1118 and cuts off the valve V1106 on its control grid. After 45 digit periods the negative pulse comes to an end and V1106 is turned on again. The resulting negative edge in the voltage waveform at the anode of V1106 triggers (resets) the R trigger circuit.

Figure 12 shows some of the waveforms in the circuit during multiplication. The action beat on the right of the figure is the first one after the last term in the summation for the product has been formed.

The 45-digit counter of Fig. 3 will now be described with reference to the circuit shown in Fig. 13 and the explanatory voltage waveform diagram, Fig. 14.

Figure 13:
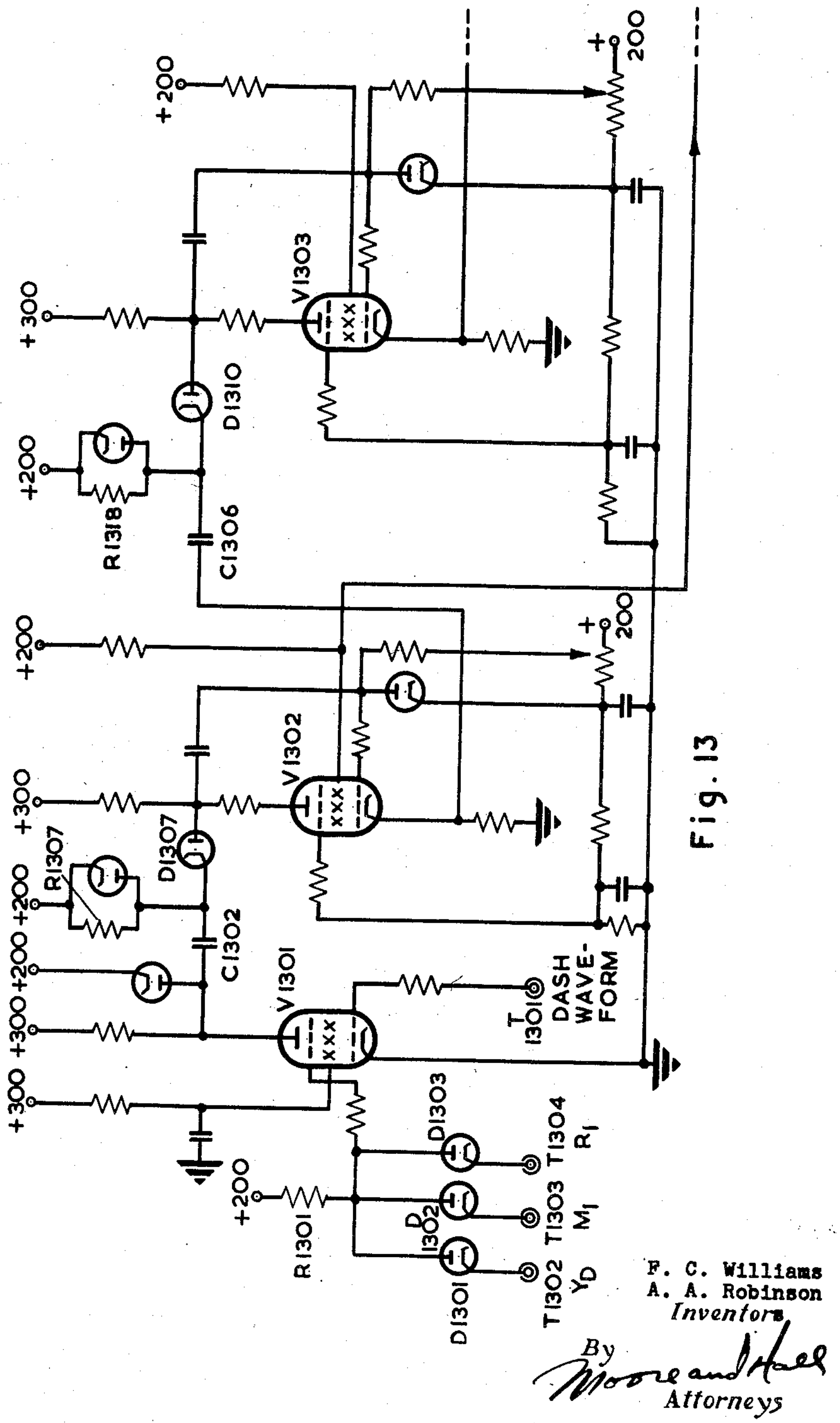
Figure 13:
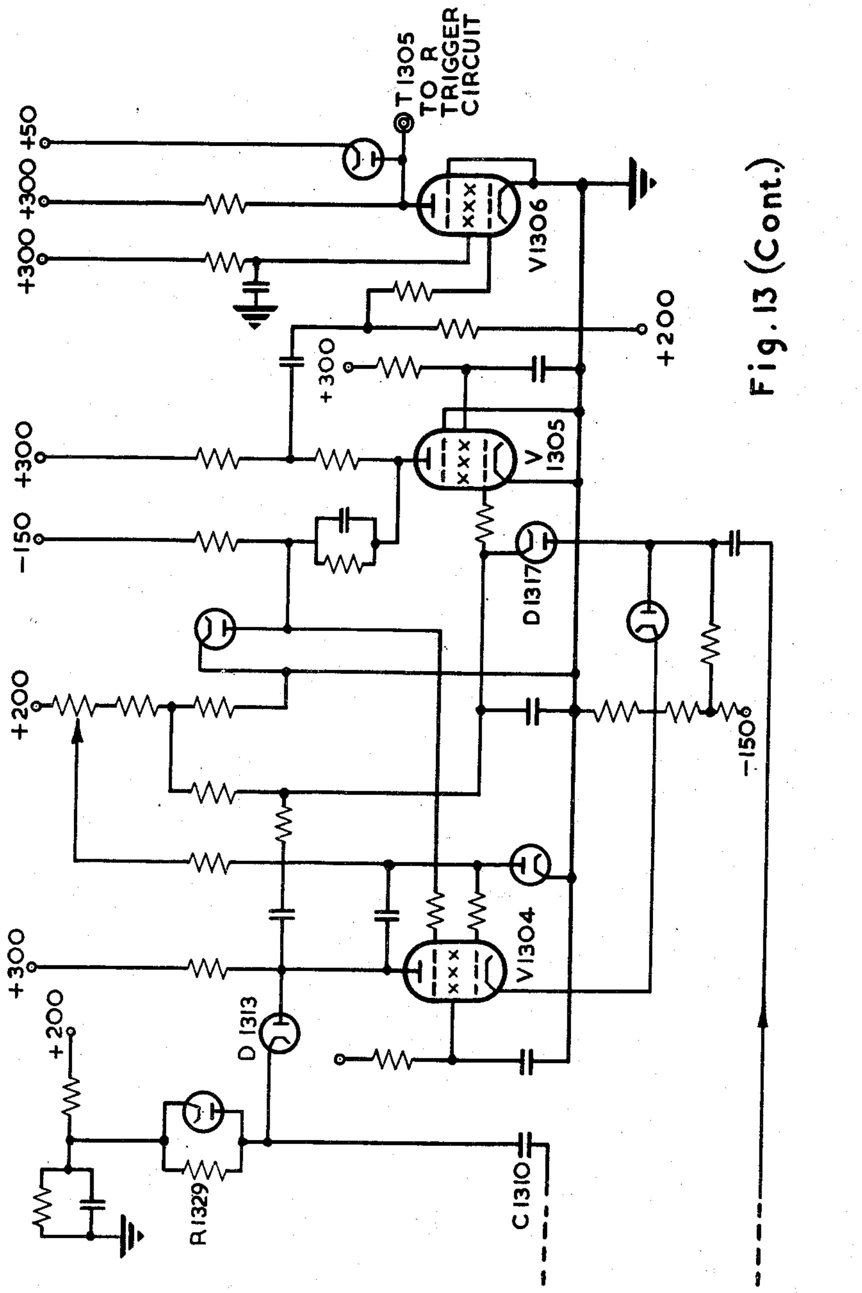

The voltages applied to terminals on Fig. 13 are as follows:

T1301—Dash waveform
T1302—The $Y_D$ waveform
T1303—The $M_1$ waveform
T1304—The $R_1$ waveform and the output voltage derived is as follows:

T1305—The 45-digit pulse to the R trigger circuit

Figures 14, 16:
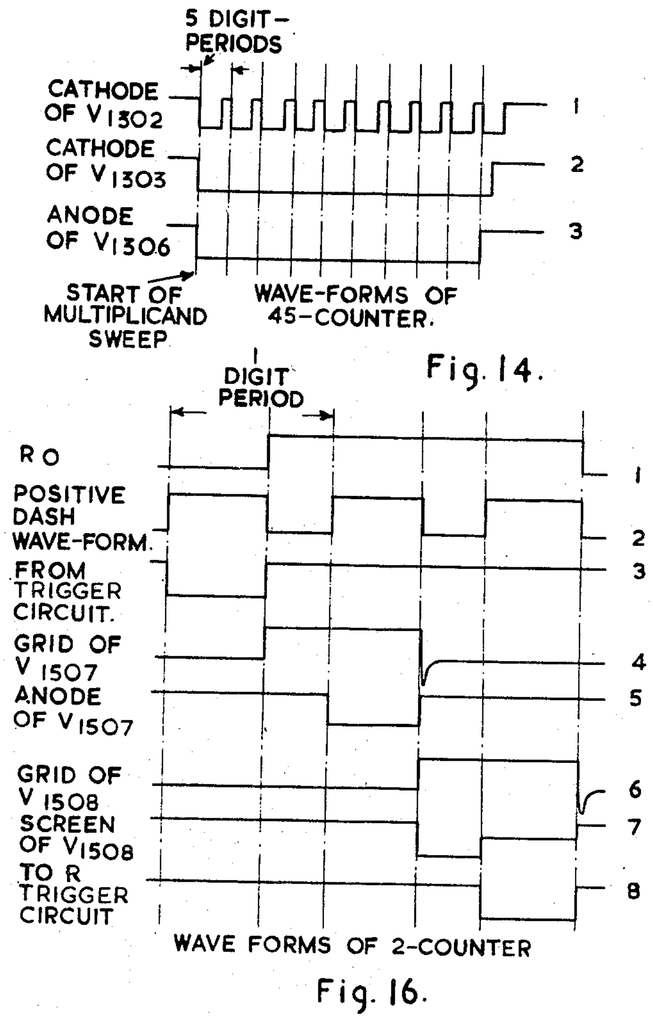

The voltage waveforms illustrated in Fig. 14 are as follows:

1. The cathode voltage of V1302
2. The cathode voltage of V1303
3. The anode voltage of V1306

The function of the 45-digit counter is to fix the length of the "multiplicand" scan on the multiplier cathode ray tube during multiplication. It does this by generating a pulse 45 digit periods long, beginning when the time-base generator is triggered for the "multiplicand" scan; the back-edge of this pulse being used to terminate the scan.

D1301, D1302, D1303 and R1301 form a coincidence gate which allows the suppressor grid of V1301 to be turned on when the $Y_D$, $M_1$ and $R_1$ waves are positive-going together. This occurs during the "multiplicand" scans of multiplication only. When the suppressor grid is turned on, the dash waveform applied to the control grid produces negative-going pulses at the anode between dash periods. These are differentiated by C1302 and R1307 and applied through D1307 to the anode of V1302 which is connected as a "phantastron", i. e. a circuit of the type described in British patent specification No. 582,758 and which is arranged to be triggered by every fifth differentiated pulse.

The negative pulses produced at the cathode of V1302 during the delay periods of the phantastron are differentiated by C1306 and R1318 and applied through D1310 to the anode of V1303 as negative pulses occurring whenever the phantastron is triggered. V1303 is also connected as a phantastron and its delay time is adjusted to be about 47 digit periods; thus it is triggered at the same time as the first phantastron and its delay period covers the whole of the required 45 digit periods of the "multiplicand" scan.

The negative pulse which appears at the cathode of V1303 during the delay period of the phantastron is differentiated by C1310, and R 1329 and applied through D1313 to the anode of V1304. V1304 and V1305 are connected as a "santrig" which is a circuit of the general type described in British patent specification No. 587,364; the santrig is triggered by a negative pulse at the cathode of D1313, and reset by the first positive pulse occurring at the anode of D1317 after the anode voltage of V1304 has reached its lower limit. These positive resetting pulses are produced by differentiating the screen-grid voltage waveform of V1302, which is similar to the cathode waveform but of opposite sign. The santrig is adjusted so that the anode voltage of V1304 reaches its lower limit between the ninth and tenth of these pulses.

In operation, the suppressor grid of V1301 is turned on at the beginning of the "multiplicand" scan, and the front edge of the first of the resulting pulses at its anode triggers the first phantastron; this triggers the second phantastron; and this in its turn triggers the santrig. When the anode voltage of V1304 reaches its lower limit the santrig is reset by the pulse obtained from the screen grid of V1302 when the first phantastron triggers for the tenth time, that is 45 digit periods after the santrig is triggered. The anode waveform of V1305 is inverted by V1306 and sent as a negative pulse, 45 digit periods long to the R trigger circuit where it is used to terminate the "multiplicand" scan. Thus, when the santrig is reset the $R_1$ waveform reverses (goes negative) and the suppressor grid of V1301 is cut off and no further triggering pulses are sent to the first phantastron. After this the first and second phantastrons complete their current operations and return to the quiescent condition ready for the next "multiplicand" scan.

The second phantastron V1303 is introduced for the following purpose. If the santrig was triggered directly from the cathode voltage waveform of V1302 it would receive triggering pulses every time the first phantastron was triggered; this includes the time at which the santrig is reset, and there would be a tendency for it to be re-triggered. This is avoided in the circuit described where the second phantastron is triggered once only during each "multiplicand" scan.

The timing of the operations of the phantastrons and the santrig is indicated in Fig. 14 by the waveforms of the voltages at the cathodes of V1302 and V1303 and at the output terminal T1305.

Figure 15:
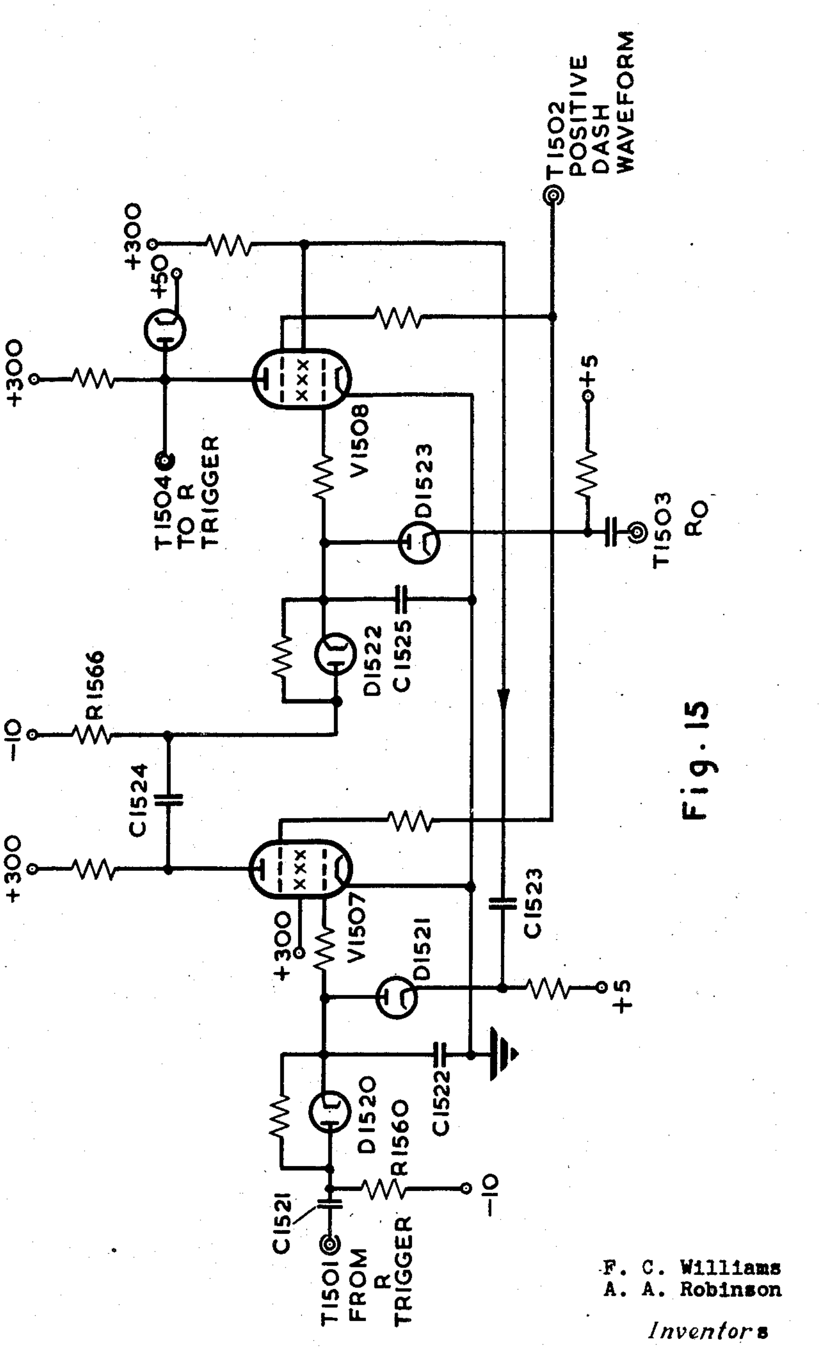

The circuit of the 2-digit counter, the function of which is to accept a negative pulse of dash length from the R trigger circuit triggering arrangements and to deliver a similar pulse two digit periods later, will now be described with reference to Fig. 15 and the voltage waveform diagram Fig. 16.

The voltages applied at the input terminals are as follows:

T1501—The resetting wave applied to the R trigger circuit from the gate 25 of Fig. 3
T1502—The positive version of the dash waveform
T1503—The $R_0$ waveform while from terminal T1504 is derived the triggering wave which is fed to the R trigger circuit.

In Fig. 16 the voltage waveforms represented are:

1. The $R_0$ wave
2. The positive dash waveform
3. The wave from the R trigger circuit triggering arrangements
4. The voltage at the grid of V1507
5. The voltage at the anode of V1507
6. The voltage at the grid of V1508
7. The voltage at the screen of V1508
8. The triggering signal fed to the R trigger circuit.

The incoming pulse is differentiated by C1521 and R1560 and the resulting positive pulse charges C1522 to earth potential and turns on the control grid of V1507. At the end of the positive pulse D1520 cuts off and C1522 remains charged. The suppressor grid of V1507 is turned off at the instant when the control grid is turned on, but it is turned on during the following dash period, and a corresponding negative pulse is produced at the anode of V1507. This pulse is differentiated by C1524 and R1566, and the positive pulse produced at its back edge charges C1525 to earth potential and turns on the control grid of V1508. This causes screen current to flow in the valve V1508 and the resulting fall in the screen potential is used (via C1523 and D1521) to turn off the control grid of V1507. When the positive pulse at the anode of D1522 dies away the diode is cut off and the valve V1508 remains turned on at its control grid. The suppressor grid of V1508 is turned on during the following dash period, and the negative pulse produced at its anode forms the output pulse which is sent to the R trigger circuit. When the R trigger circuit is triggered, the wave $R_0$ goes negative and is used to turn off the control grid of V1508 via D1523.

The circuit of the multiplier time base and multiplier blackout waveform generator will now be described in greater detail with reference to Fig. 17 and the explanatory waveform diagram Fig. 18.

Figure 17:
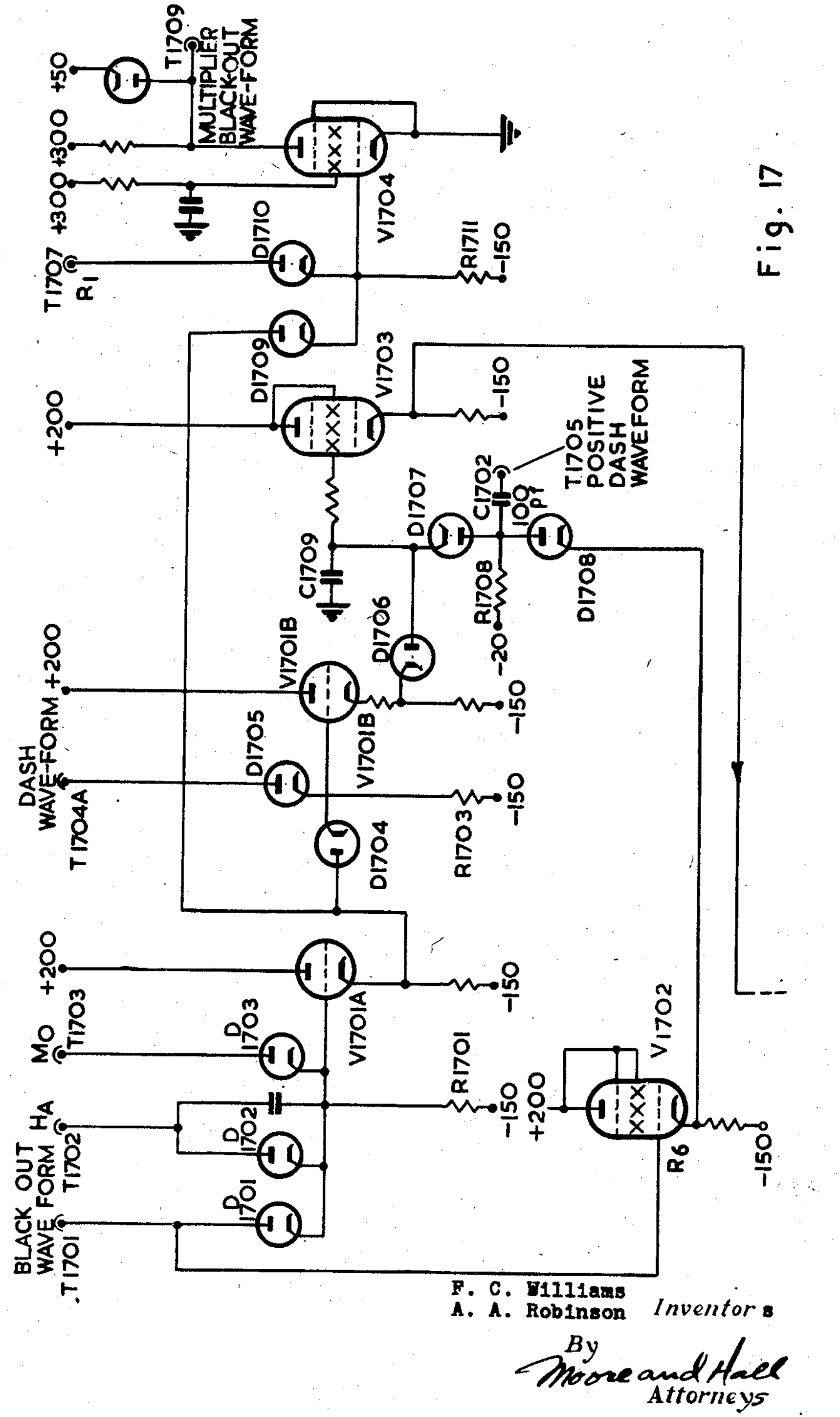
Figure 17:
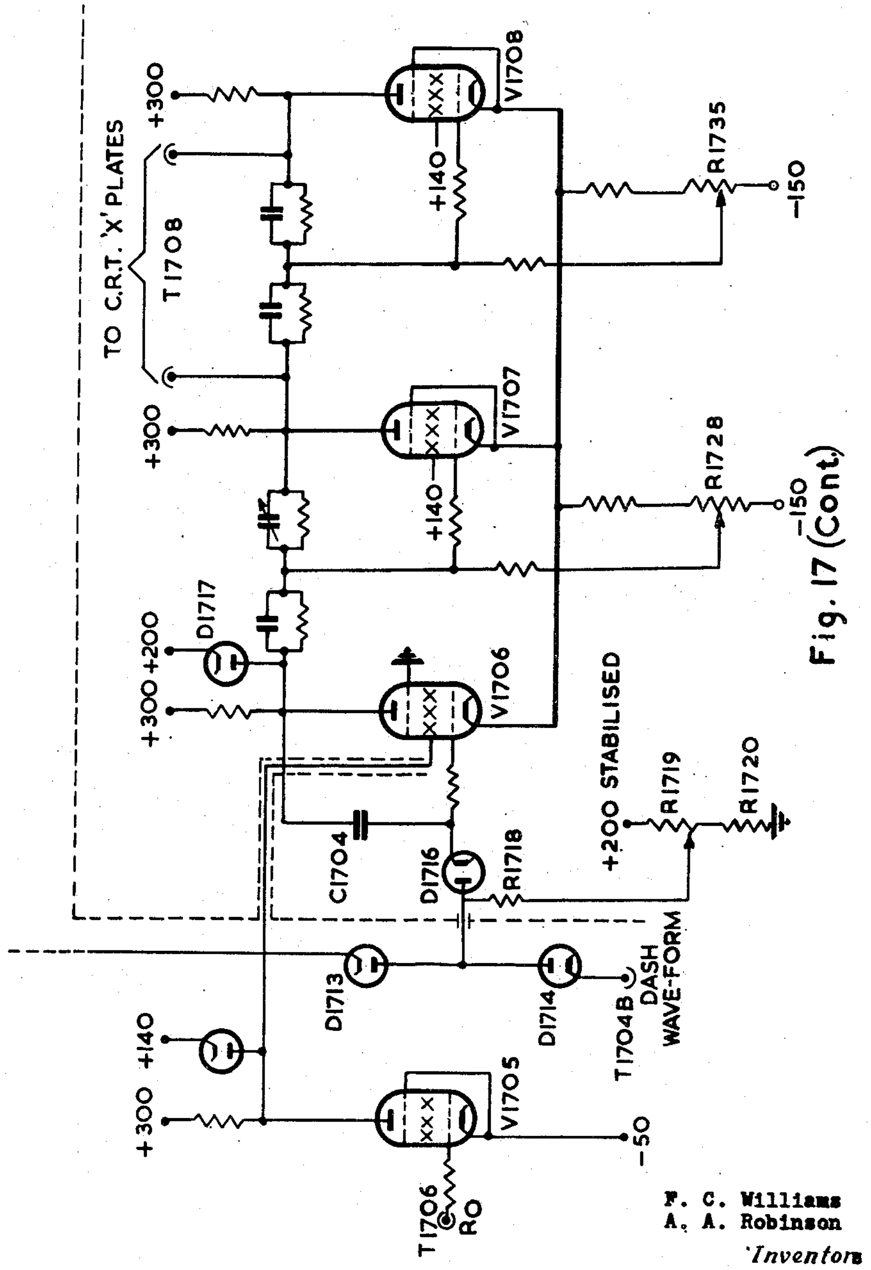

The voltage waveforms applied to terminals of the circuit of Fig. 17 are as follows:

T1701—The blackout waveform
T1702—The halver ($H_A$) waveform
T1703—The $M_0$ waveform
T1704–A. and –B. the dash waveform
T1705—The positive (inverted) dash waveform
T1506—The $R_0$ waveform
T1707—The $R_1$ waveform and the terminals T1708 provide the time-base deflecting voltage waveform which is applied to the multiplier cathode-ray-tube X deflector plates and terminal T1709 provides the special multiplier blackout waveform.

Figure 18:
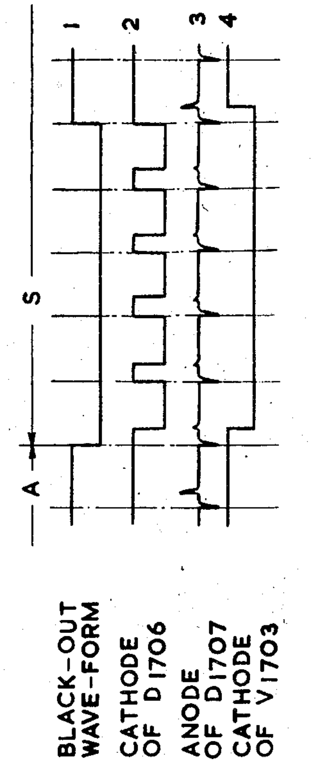

The waveforms of Fig. 18 represent the following voltages connected with the production of the multiplier blackout voltage wave.

1. Blackout waveform
2. Cathode voltage of D1706
3. Anode voltage of D1707
4. Cathode voltage of V1703

This circuit generates the time-base waveform which is applied to the X deflector-plates of the multiplier storage cathode-ray-tube in the periods when the R trigger circuit is in the "scan" condition. The time-base waveform is made to pause during dash periods and also during the action-to-scan blackout periods of multiplication. The pause during dash periods is concerned with the "dot-dash" mode of storage employed, as described in the patent specifications previously referred to.

It is essential that the pause during black-out periods should be very close to its nominal length. This is facilitated by making the edges of the pause waveform fall within dash periods when the time-base is, in any case, stationary; small variations in the width of the pause waveform do not then affect the length of the pause in the time-base. In practice the pause signal is obtained from the black-out waveform pulses by delaying the edges until the beginning of the following dash periods. The finite speed of the edges and the delay inherent in the circuits then bring the operative parts of the edges into the dash periods.

The pause and multiplier black-out waveforms are formed as follows. D1701, D1702, D1703 and R1701 form a coincidence gate which allows the grid of the cathode-follower V1701A to go negative only when the black-out waveform, and the $H_A$, and $M_0$ waves are negative together; that is during action-to-scan blackout periods of multiplication. The resulting cathode-followed voltage waveform is combined with the $R_1$ waveform in an "or" device or buffer circuit comprising D1709, D1710 and R1711 to form the "multiplier" blackout waveform which is sent to the writing unit in the regenerative loop of the multiplier cathode-ray-tube.

D1704, D1705 and R1703 form a coincidence gate which allows the dash waveform to pass via the cathode-follower V1701B to the cathode of D1706 during action-to-scan blackout periods of multiplication. A positive version of the dash waveform is differentiated by C1702 and R1703, producing positive pulses at the anode of D1707 at the beginning of dash periods, which are suppressed by the blackout wave fed via the cathode follower V1702 to the diode D1708 during blackout periods. C1709 is normally held charged above earth potential by these positive pulses; but, during action-to-scan blackout periods, when the positive pulses are withdrawn, C1709 is charged to a negative potential by the first of the dash pulses appearing at the cathode of D1707. C1709 remains charged negatively until the end of the blackout period when the dash pulses are withdrawn and it is charged positively by the first of the positive pulses at the anode of D1707. Thus the voltage waveform appearing across C1709, which is fed to the time base generator circuit via the cathode follower V1703, is the action-to-scan blackout waveform with its edges delayed until the beginning of the following dash period. It will be appreciated that the dash waveforms applied to this circuit must be continuous, i. e. must provide pulses during the blackout periods.

The time-base deflection voltage waveform is generated by V1706 which is connected as a Miller integrator. During waiting periods of the time-base the $R_0$ voltage waveform is above earth potential and the anode potential of V1705 is at its lower limit, so the screen of V1706 is held below earth potential; no anode current can flow in V1706 and the anode potential is caught by V1717. When the R trigger circuit is triggered into the "scan" condition, the $R_0$ waveform goes negative and the screen of V1706 is turned on. The anode potential of V1706 then falls linearly at a rate given by the value of C1704 and the current flowing in D1716. Between the pauses the cathode of D1713 and D1714 are positive and the diodes are cut off so current flows from the stabilised +200 v. line through the divider chain R1719, R1720, the high-stability resistor R1718 and the diode D1716 to the grid of V1706. During dash periods, however, the cathode of D1714 is driven negative by the dash waveform; D1714 then conducts reducing the potential of the combined anodes of D1713, and D1716, so that D1716 is cut off, no current flows to the grid of V1706 and the time-base pauses until the end of the dash period. The action-to-scan blackout period pause waveform from V1703 is similarly applied to the cathode of D1713.

The time-base waveform appearing at the anode of V1706 passes through the "see-saw" push-pull amplifier circuits formed by V1707 and V1708 and their associated components, and is taken from their anodes to the X deflector plates of the storage cathode-ray-tube.

The amplitude of the time-base deflection can be adjusted by the potentiometer R1719; and the D. C. levels of the deflector plates can be independently adjusted by the potentiometers R1728 and R1735. V1706, V1707 and V1708 with their circuits are screened from the remainder of the circuit of Fig. 17 since they are susceptible to capacitative interference at the control grids of the valves.

A detailed circuit for the Y-shift generator 4 of Fig. 3 will now be described with reference to Fig. 19 and the explanatory voltage waveform diagram Fig. 20.

Figure 19:
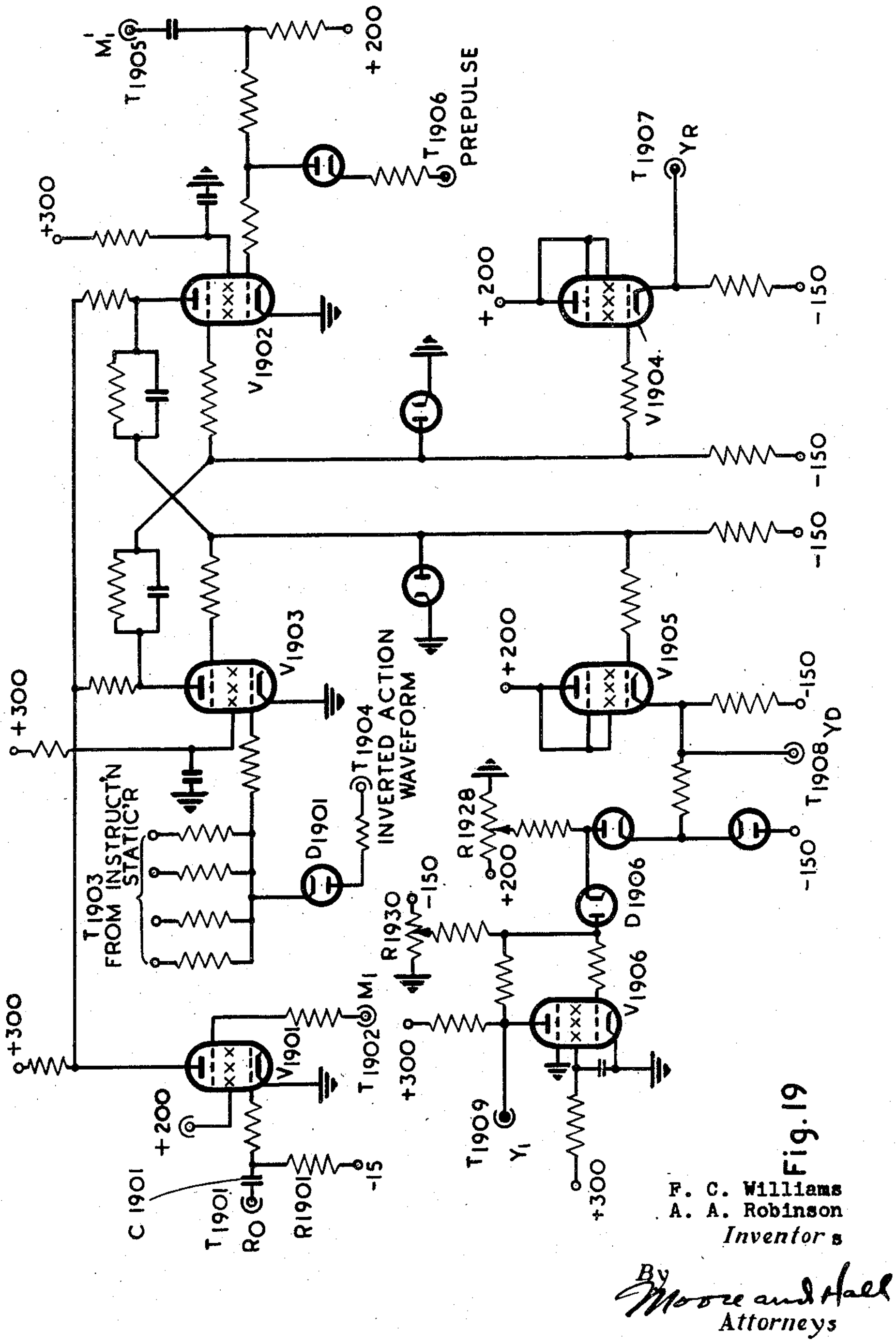

The voltage waveforms applied to terminals on the circuit of Fig. 19 are as follows:

T1901—The $R_0$ waveform
T1902—The $M_1$ waveform
T1903—The control voltages from the instruction staticisor
T1904—The inverted action waveform
T1905—The $M_1{}^1$ waveform
T1906—The prepulse waveform and the following output voltage waveforms are derived:

T1907—The $Y_R$ waveform
T1908—The $Y_D$ waveform
T1909—The $Y_1$ waveform which is actually fed to the cathode-ray-tube deflecting plates The voltage waveform diagrams illustrated in Fig. 18 are as follows:

1. The prepulse waveform
2. The $M_1$ waveform
3. The $M_1{}^1$ waveform
4. The grid potential waveform of V1903
5. The $R_0$ waveform
6. The $Y_D$ waveform This circuit applies to one Y deflector-plate of the storage tube a voltage determining which of the stored numbers is being scanned. V1902 and V1903 form a D. C. suppressor-grid-coupled trigger circuit whose state determines which line on the multiplier cathode-ray-tube is being scanned. The control grid of V1902 is driven negative by the prepulse at the beginning of $S_1$ beats, so the trigger circuit always begins a bar in the V1902-off, or "multiplicand" condition. The control grid is also driven negative by the negative going edge of the $M_1'$ waveform at the end of every multiplication. This is to ensure that the trigger circuit is returned to the "multiplicand" condition at the end of multiplication even though a prepulse may not be given immediately. The control grid of V1903 is connected through high resistors to outputs of the instruction staticisor chosen so that the mean level is negative only for the instructions $s$,R and $s'$R which require a number to be written into the "multiplier" line of the store. D1901 prevents the grid of V1903 from going negative until the beginning of the $A_2$ beat when the inverted action waveform applied to the anode of the diode goes negative. Thus, for the above instructions the circuit is triggered into the V1903-off, or "multiplier" condition at the end of $A_2$ and remains in this condition until the beginning of multiplication.

V1901 shares its anode load with V1902 and V1903 so that when a pulse of current passes through V1901 the trigger circuit changes its state. The suppressor grid of V1901 is turned off by the $M_1$ waveform, so that V1901 is inoperative before the beginning of multiplication. During multiplication the valve V1901 passes a pulse of current every time its control grid is turned on by the differentiated positive-going edges of the $R_0$ waveform (differentiated by C1901 and R1901), i. e. when the time-base waveform flies back. Thus during multiplication the state of the trigger circuit is changed whenever the time-base waveform flies back.

The suppressor grid wave-forms of the trigger circuit are cathode-followed by V1904 and V1905, and form the signals $Y_R$ and $Y_D$. The $Y_D$ voltage waveform is used to switch the current flowing to the grid of V1906 through D1906 by an arrangement of diodes similar to that used to produce the pause in the time-base (see Fig. 17). V1906 is connected in a unity-gain phase-reversing circuit and produces at its anode a voltage change proportional to the current flowing into the grid. The anode voltage waveform, $Y_1$, is applied to one of the Y deflector-plates of the multiplier cathode ray tube. The D. C. level of $Y_1$ can be adjusted by the potentiometer R1930 and the separation of the "multiplier" and "multiplicand" lines is adjusted by R1928.

Figure 20:
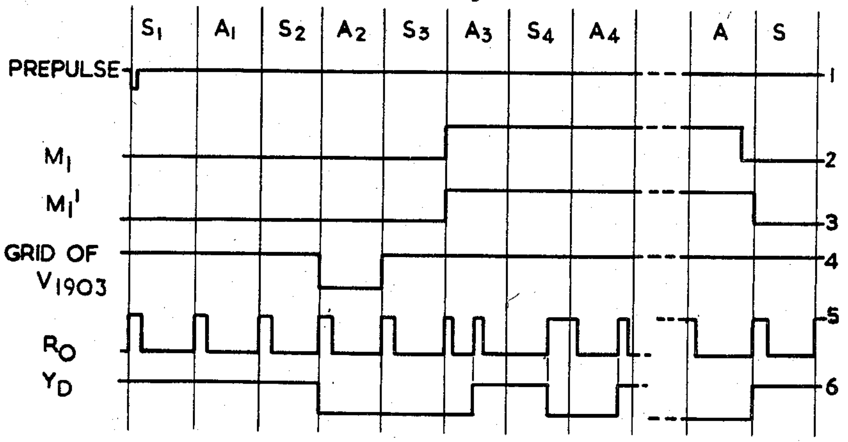

In Fig. 20 which shows some of the wave-forms of the Y-shift generator during multiplication, the beat, A, on the right is the first action beat after the last term in the summation for the product has been formed.

The detailed circuits of the complement converter 34, the gate 8 and the sign determining trigger 40 of Fig. 5 will now be described with reference to Fig. 21 and the explanatory voltage waveform diagrams of Fig. 22.

Figure 21:
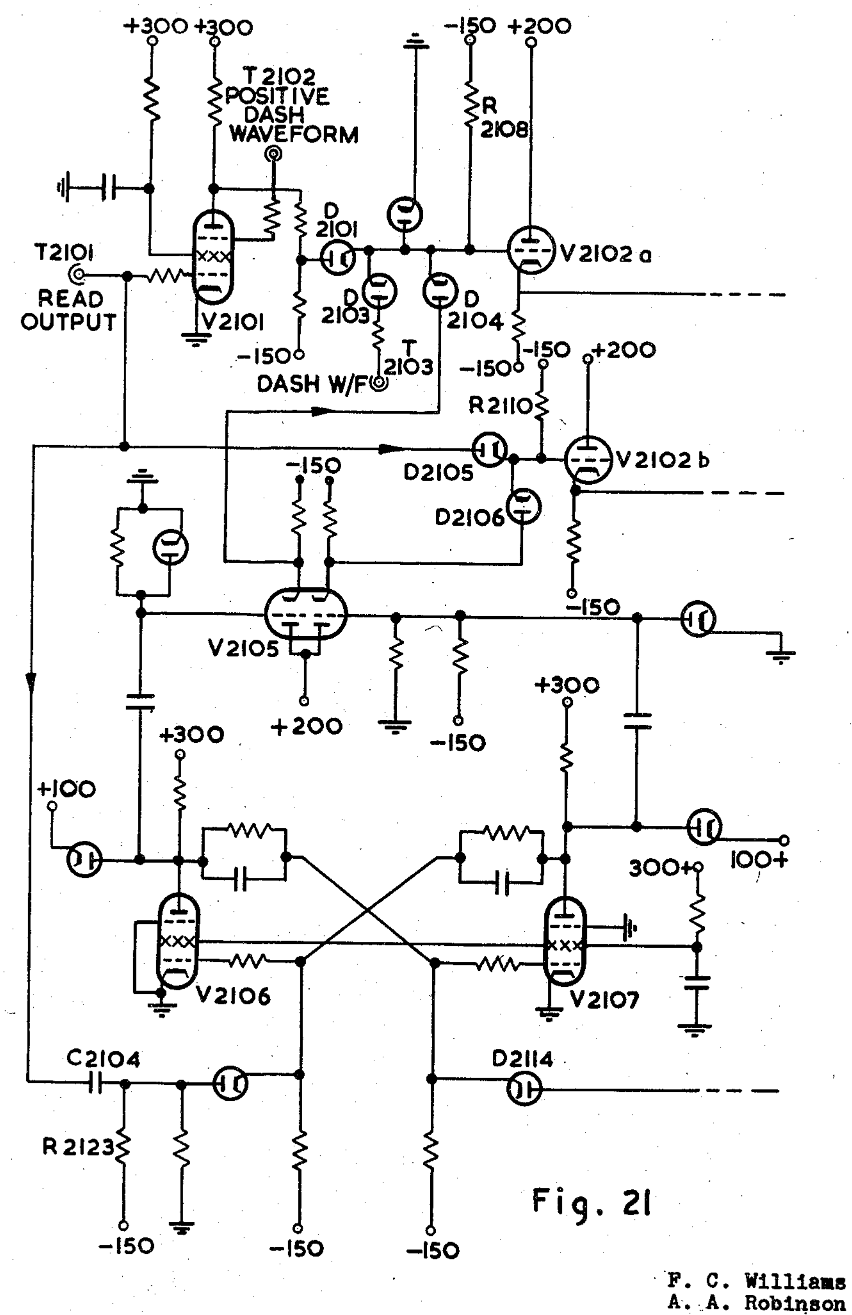
Figure 21:
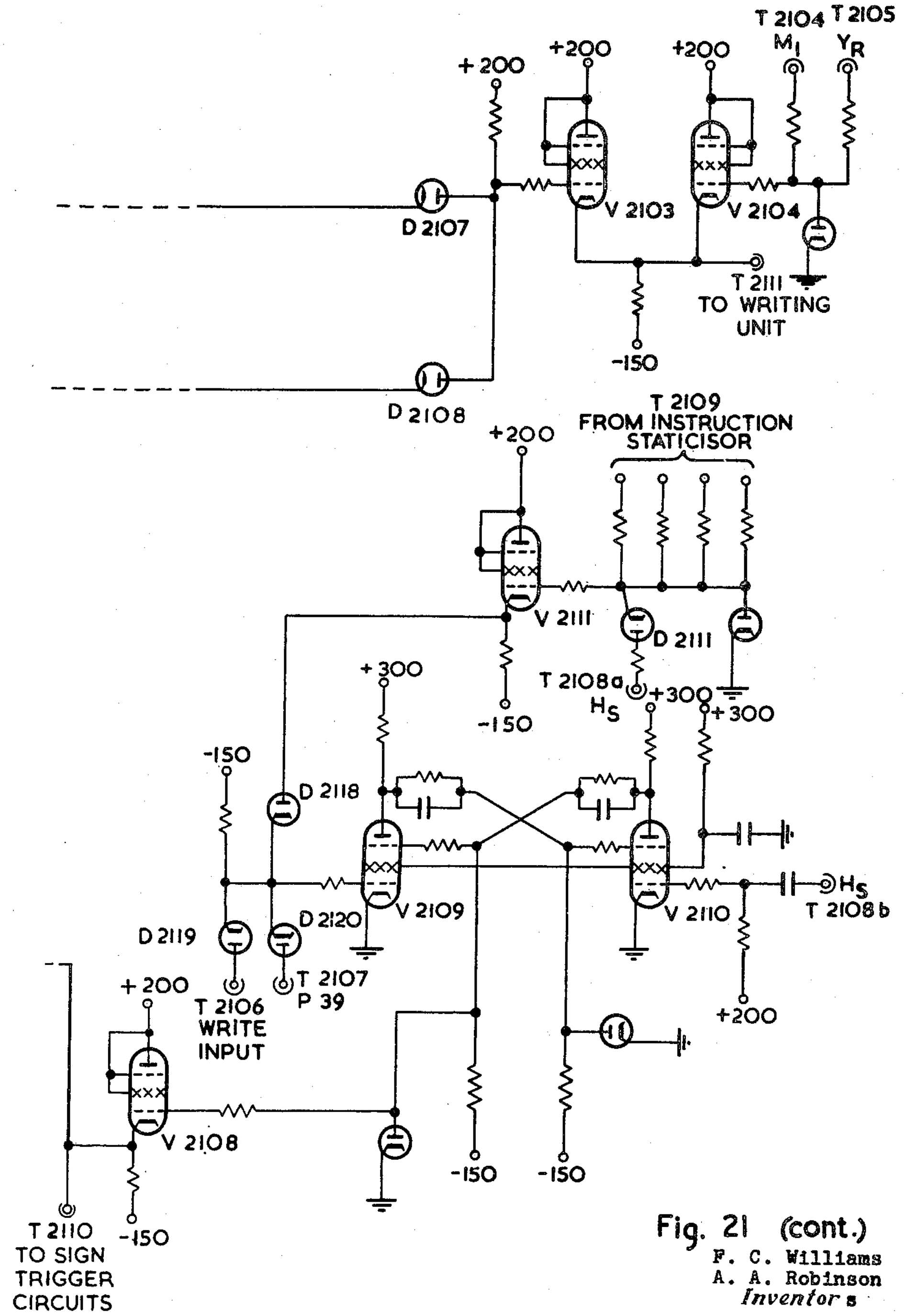
Figure 22:
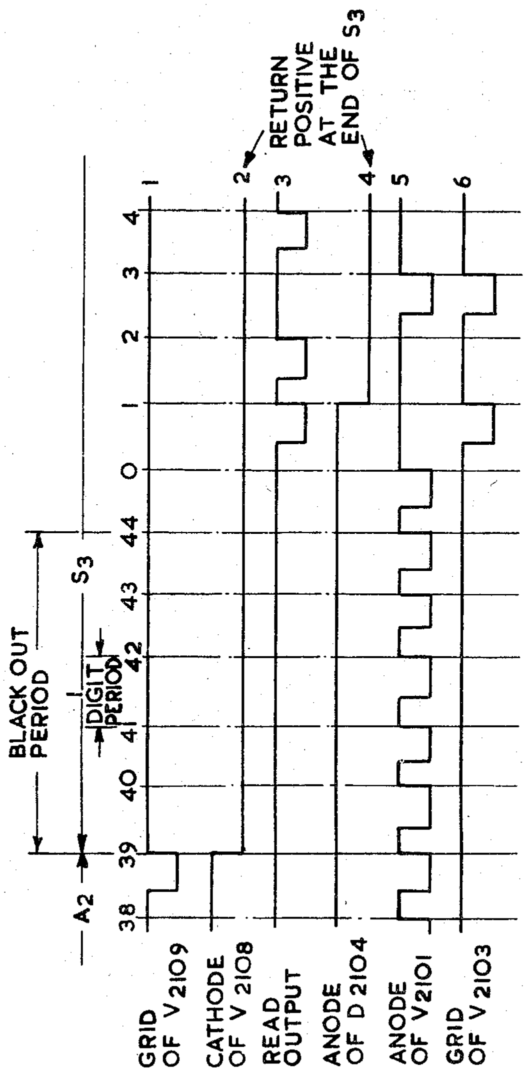

The voltage applied to terminals on Fig. 21 are as follows:

T2101—Read output from the multiplier cathode ray tube reading unit (6 of Fig. 5)
T2102—Positive dash waveform
T2103—Dash waveform
T2104—The $M_1$ waveform
T2105—The $Y_R$ waveform
T2106—The write input to the multiplier
T2107—The $p_{39}$ pulse
T2108$a$ and $b$—The Hs waveform
T2109—The input from the instruction staticisor and the output voltages provided are as follows:

T2110—The output signal to the sign trigger circuits 42 and 45 of Fig. 5
T2111—The output signal to the writing unit (7, Fig. 5) of the multiplier cathode ray tube regenerative loop The voltage waveforms shown in Fig. 22 are as follows:

1. The grid voltage of V2109
2. The cathode voltage of V2108
3. The read output
4. The anode voltage of D2104
5. The anode voltage of V2101
6. The grid voltage of V2103

This circuit detects the existence of a "1" digit pulse in the write input signal to the multiplier store at the time of pulse $p_{39}$ during A2. If this pulse is present and if the instruction being obeyed is $s'$,D or $s'$,R the number recorded in the multiplier store is complemented during the following beat. The regenerative loop of the store is broken during "multiplier" scans of multiplication in this part of the multiplier circuit by the gate 8 (Fig. 5) which comprises valves V2105 and V2104.

Normally when a number is being regenerated unchanged, the D. C. suppressor-grid coupled trigger circuit V2106, V2107 (the complement trigger) is in the V2106-off condition and the anode voltage waveforms—cathode-followed by V2105 to the anodes of D2104 and D2106—are respectively positive and negative. The read output waveform from the multiplier reading unit is passed through the coincidence or "and" gate D2105, D2106, R2110 cathode-followed by one half of V2102 and by V2103 and sent back to the writing unit of the multiplier regenerative loop. V2104 is cut off since the mean level of the $M_1$ and $Y_R$ waves is negative except during "multiplier" scans of multiplication. No signal is passed through the coincidence gate D2101, D2104, R2108 so long as the anode of D2104 is positive.

During multiplier scans of multiplication the mean level of the $M_1$ and $Y_R$ waves is positive and this steady potential is cathode followed by V2104. If negative (digit) pulses reach the grid of V2103, they cut that valve off but produce no effect at the common cathode point of V2103 and V2104 so that the regenerative loop is inhibited.

The procedure for complementing is as follows:

The control grid of V2111 is connected through high resistors to outputs of the instruction staticisor so chosen that their mean level is negative only for the instructions $s'$,D and $s'$,R. Diode D2121, the anode of which is fed with the Hs wave, is used to prevent the grid of V2111 from going negative until the beginning of A2. D2118, D2119, D2120 and R2135 form a coincidence gate which allows a negative digit pulse ("1") in the write input to the multiplier store to pass through to the control grid of V2109 during the $P_{39}$ pulse of the cathode-followed grid waveform of V2111 is negative.

V2109 and V2110 are connected as a direct-coupled trigger circuit (forming the sign-determining trigger 40 of Fig. 5) which is normally in the V2110-off condition by virtue of the Hs wave applied to the grid circuit of V2110. The circuit is triggered into the opposite, "complementing," condition when the control grid of V2109 is driven negative and is returned to the normal condition at the end of beat S3 by the negative edge of the differentiated Hs wave.

When the trigger circuit V2109, V2110 is in its normal condition, the suppressor grid voltage waveform of V2110, cathode followed by V2108, clamps the complement trigger circuit V2106, V2107 in the V2106-off condition so that numbers in the store are regenerated unchanged as explained above. However, if the trigger V2109, V2110 is in the "complementing" condition, the circuit V2106, V2107 is free to be triggered by the differentiated positive-going (back edge) of the first digit pulse (provided by C2104, R2123) appearing at the read output of the multiplier cathode ray tube regenerative loop during the S3 beat. While the trigger circuit V2106, V2107 is in the V2107-off condition the anodes of D2104 and D2106 interchange their normal potentials so that signals from the read output of the regenerative loop can no longer pass via the coincidence gate D2105, D2106, R2110.

The valve V2101 forms a "not" device, the signal appearing in its anode circuit representing the result of performing the logical operation "not" upon the binary number appearing as the read output from the multiplier store. In the absence of "1" digit pulses in the read output-signal the valve V2101 is not cut off on its control grid and the positive dash waveform fed to the suppressor grid results in the production of negative-going dash ("1" digit) pulses at the anode. When a "1" digit pulse occurs in the read output signal the valve V2101 is cut off on its control grid and the corresponding negative dash pulse at the anode is suppressed. The anode output voltage is therefore a true "not" version of the read output signal, a "1" digit in the read output signal giving rise to "0" digit signal (absence of a dash pulse) in the anode voltage output wave and vice-versa. After the trigger circuit V2106, V2107 has been triggered at the back edge of the first "1" digit signal in the read output from the multiplier store during an S3 beat the signal at the anode of V2101 passes through the coincidence gate D2101, D2104, R2108, the cathode follower V2102 and the diode D2107 to the cathode follower V2103 and thence to the writing unit of the multiplier cathode ray tube regenerative loop. This process of passing a number unchanged until after the first "1" digit and performing the "not" operation on the remaining (more signficant) digits is, as previously stated, the operation of obtaining the complement of a number.

In order to shape the output wave from V2101 which is fed to V2102*a* an additional diode element D2103, the anode of which is fed with the dash waveform, is included in the coincidence circuit comprising D2101 and D2104 so that the digit pulses passed by the gate are accurately terminated by the back edges of the standard dash pulses. The diode D2102 prevents the common point of the coincidence circuit D2101, D2103, D2104 rising in potential above earth level.

Fig. 22 shows some of the waveforms in the sign-determining trigger circuit and in the complement converter and its clamping circuit at the end of an A2 beat and during the early part of the following S3 beat against a time scale of $p$ pulses. The voltage waveforms illustrate the case in which the most significant digit ($p_{39}$) of a number written into the multiplier during the A2 beat is a "1" with the result that complementing occurs during the S3 beat, the least significant digit ($p_0$) in the original number being assumed to be a "1."

The circuits of the sign trigger circuits D and RD (42 and 45) of Fig. 5 will now be described with reference to Fig. 23 and to the explanatory voltage waveform diagrams of Fig. 24.

Figure 23:
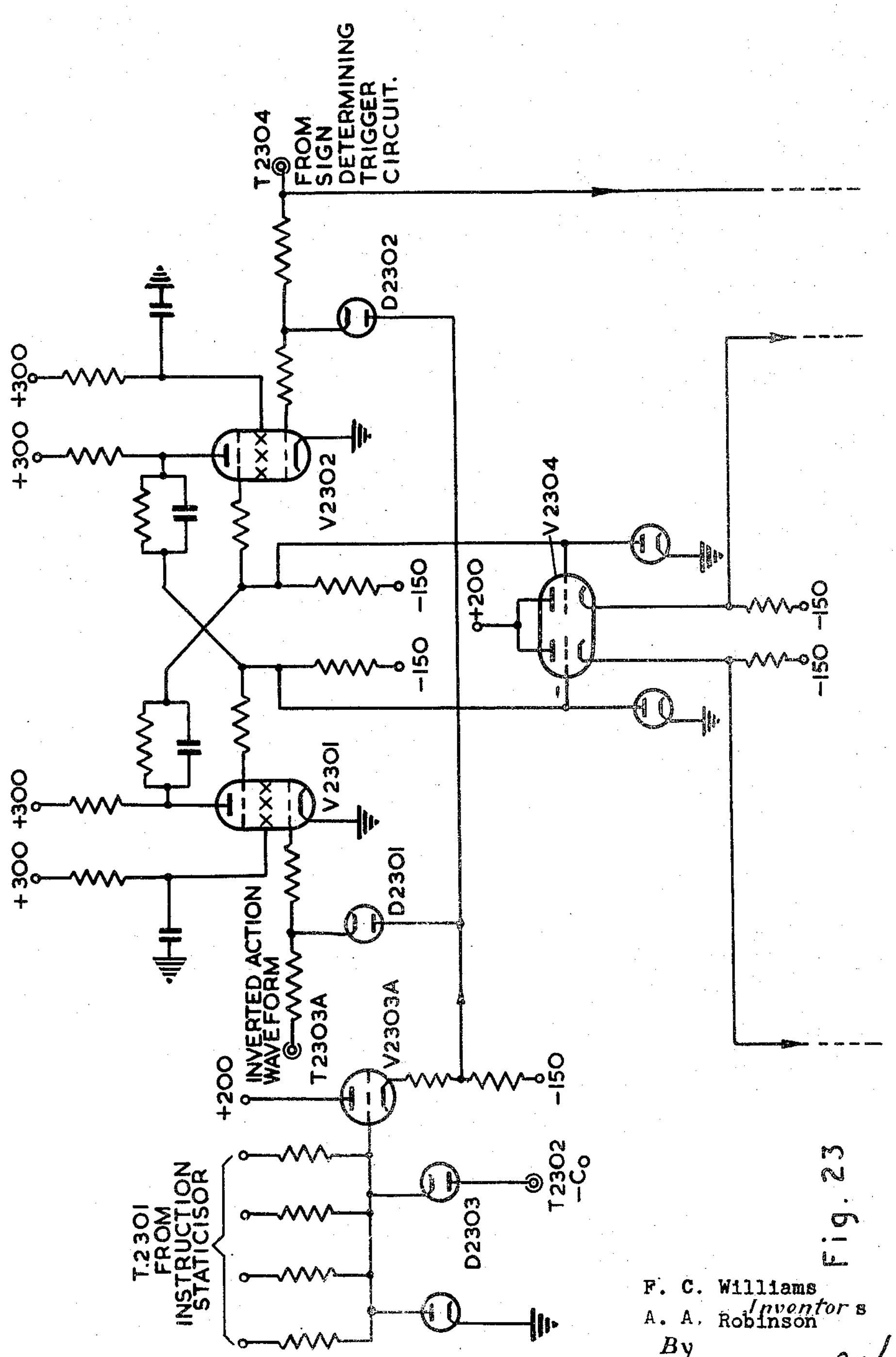
Figure 23:
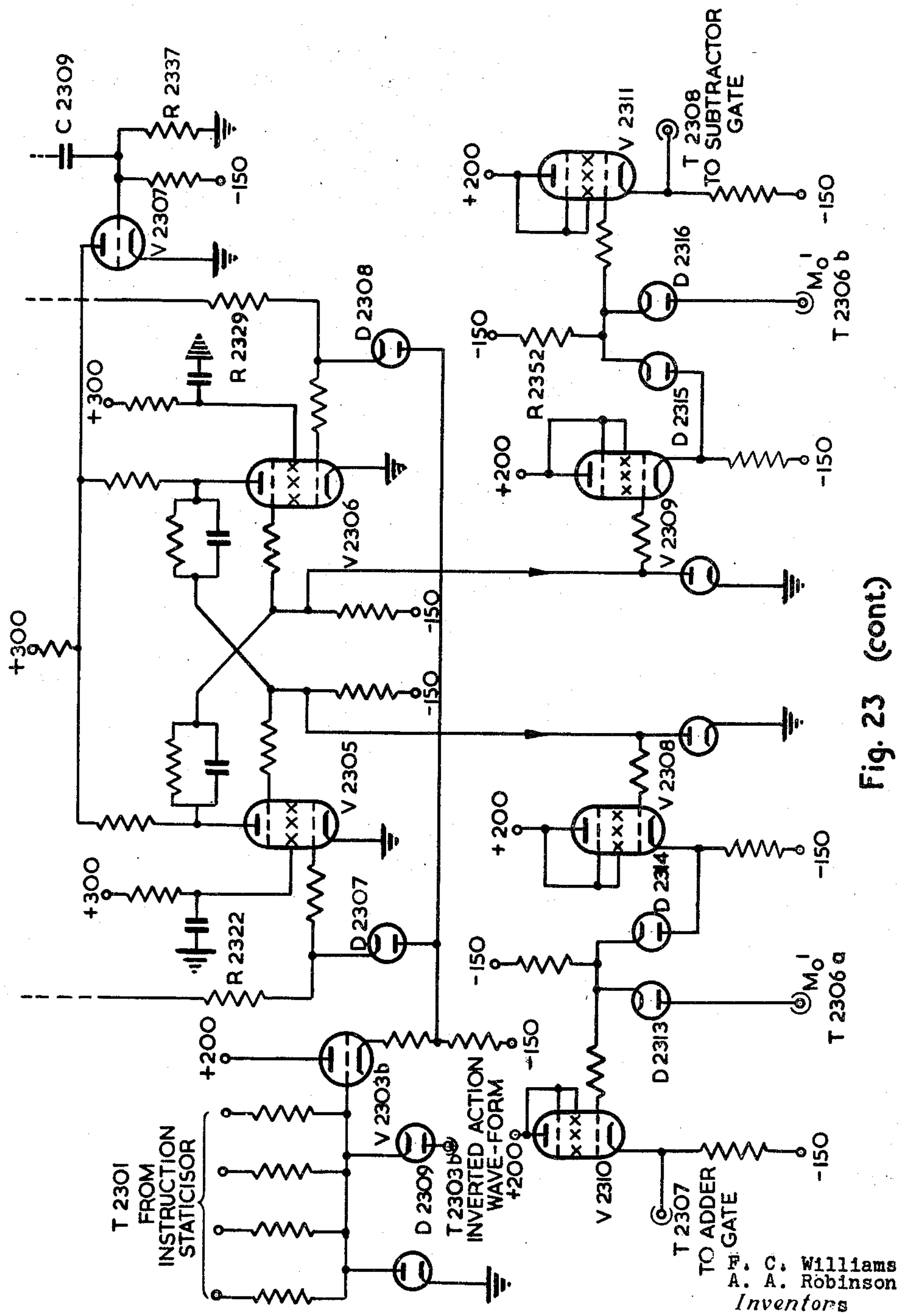

The voltage applied at terminals of Fig. 23 are as follows:

T2301—Input from the instruction staticisor
T2302—The inverted "counter 0" ($-C_0$) waveform which is a rectangular waveform of one half the frequency of the halver wave ($H_A$ or $H_S$). This $-C_0$ wave is positive during A1 and S2 beats and negative during A2 and S3 beats.
T2303*a* and *b*—The inverted action waveform
T2304—The output from the sign determining trigger circuit 40 of Fig. 5 (see also Fig. 21)
T2305—Input from the instruction staticisor
T2306*a* and *b*—The $M_0'$ waveform and the following output voltages are obtained:

T2307—Control voltage wave to the accumulator add gate 34, Fig. 5.
T2308—Control voltage wave to the accumulator subtract gate 35, Fig. 5.

Figure 24:
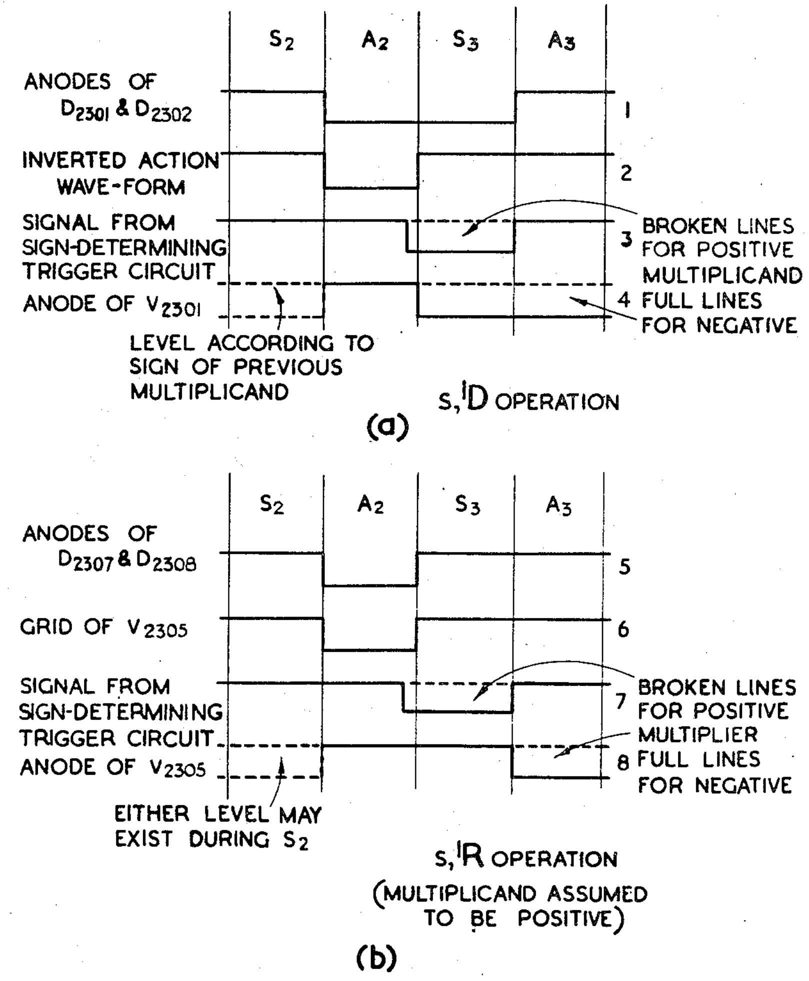

The voltage waveforms shown in Fig. 24 are as follows:

1. Anode voltage of D2301 and D2302
2. Inverted action waveform
3. Signal from the sign determining trigger 40
4. Anode voltage of V2301 for the s',D operation, and:

5. Anode voltage of D2307 and D2308
6. Grid voltage of V2305
7. Signal from the sign-determining trigger 40
8. Anode voltage of V2305 for the s',R operation.

The function of the circuit shown in Fig. 23 is to record the sign of the multiplicand on the D trigger circuit V2301, V2302 and to determine the sign of the product by the state of the RD trigger circuit V2305, V2306. It receives on terminal T2304, from the sign-determining trigger circuit the cathode-followed suppressor grid voltage waveform of V2109, Fig. 21, which is steady at approximately earth potential if the incoming number fed to the multiplier is positive and which goes negative, from the $p_{39}$ pulse occurring in beat A2 to the end of beat S3, if the incoming number is negative.

The direct-suppressor-grid-coupled trigger circuit V2301, V2302 records by its state the sign of the multiplicand. Normally both control grids are held at earth potential by current flowing from the cathode of V2303*a* through D2301 and D2302, so that the circuit cannot be triggered in either direction. The grid of V2303*a* is connected to outputs of the instruction staticisor chosen so that their mean level is negative only when a new multiplicand is to be sent to the multiplier store (s,D or s',D operations). The $-C_0$ wave which is negative during A2 and S3 but positive during S2, is used (via D2303) to prevent the control grids from being unclamped until the beginning of A2. As soon as the grids are unclamped that of V2301 is turned off by the inverted action waveform, so that if the input from the sign-determining trigger circuit is positive and the grid of V2302 remains on, the circuit is set into the V2301-off—or positive—condition. The inverted action waveform goes positive again at the end of A2, whereas a negative pulse from the sign-determining trigger lasts until the end of S3, so if this negative pulse exisits it will set the circuit into the negative condition at the beginning of S3. At the end of S3 the grids are clamped again so that the sign of the new multiplicand is stored until the next one is about to be sent to the multiplier store.

The direct suppressor-grid-coupled trigger circuit V2305, V2306, the RD trigger circuit, has its control grids clamped in the condition by diodes D2307, D2308 except when the cathode of V2303*b* is negative. The grid of V2303*b* is connected to the instruction staticisor, and, through D2309 to the inverted action waveform source, so that the cathode is negative during A2 only when the operations *s*,R and *s'*,R [in which a new multiplier is sent to the multiplier store] are being effected. During A2, when the grids are unclamped, the trigger circuit is set into the same state as the D trigger circuit by turning off the appropriate control grid via R2322 or R2329 by the suppressor grid voltage of V2301 or V2302, cathode followed by V2304. At the end of A2 the control grids are clamped again so that no further triggering is possible by this means. The positive going edge of the voltage pulse from the sign determining trigger circuit is differentiated by C2309 and R2307 and turns on the grid of V2307 at the end of S3 if the incoming multiplier is negative. The anode load of V2307 is also part of the anode load of both valves of the RD trigger circuit and, if V2307 is pulsed on as described above, the trigger circuit changes its state. Thus if the multiplier is positive the RD trigger circuit comes to rest in the condition representing the sign of the multiplicand, but if the multiplier is negative the RD trigger circuit comes to rest in the opposite condition. In the multiplication which immediately follows the above processes the sign of the product is given by the state of the RD trigger circuit whose suppressor grid potentials are gated by the $M_0'$ wave in the coincidence gates D2313 D2314, R2349 and D2315, D2316, R2352 cathode-followed by V2310 and V2311 and sent to control the subtractor and adder gates respectively in the accumulator regenerative loop.

In Fig. 24, which shows the voltage waveforms referred to, and which illustrate the operation of the D and RD trigger circuits, part (*a*) refers to the *s'*,D operation in which the multiplicand is written into the multiplier store and its sign recorded. Only those beats S2 and A2 of the bar concerned with the *s'*,D operation are shown and the first two beats of the following bar (shown as S3, A3 but actually S1 and A1 of Fig. 4). It will be seen that the original condition of the D trigger circuit (anode voltage of V2301 during S2) is immaterial as V2301 is cut off at the commencement of A2 by the inverted action waveform. The dotted portions the waveforms (3) and (4) of Fig. 24 represent conditions when the multiplicand is positive while the corresponding full-line portions represent conditions for a negative multiplicand.

Part (*b*) of Fig. 24 represents the voltage waveforms previously referred to during the beats S2—A3 of the bar concerned with the *s'*,R operation on the assumption that the multiplicand already recorded by the D trigger circuit is positive (i. e. the anode potential of V2301 is at its lower limit and the suppressor potential of V2301 at its upper limit). The full-line portions of the waveforms (7) and (8) during the S3 and A3 beats represent conditions for a negative multiplier while the broken line portions represent conditions for a positive multiplier. It will be seen that the condition of the RD trigger circuit (anode voltage of V2305—waveform (8)) is immaterial during the S2 beat.

The multiplier arrangement which has been described in general terms with reference to Fig. 3 or Fig. 5 and the circuit arrangements of which have been disclosed in detail employs a single cathode-ray-tube storage unit to record the two factors R and D. It will be obvious that the recording of the two factors upon a single two-line (or two number) cathode-ray tube, while effecting a saving in apparatus, is not an essential feature of the invention and that two separate cathode-ray tube storage units could be employed, each tube recording one of the factors only.

Such a modification of the multiplier could be made in obvious fashion by employing time base generating and timing circuit arrangements similar to those already described and causing the generated time-base waveform to be applied to both the factor storing tubes in parallel. The Y-shift generator system would not however be employed to produce any transverse deflection but would be employed to select which factor storage tube was operative during the various phases of the operation during active multiplication. The selection could be conveniently carried out by using appropriate versions of the $Y_R$ or $Y_D$ waves to control the blackout or illumination of the tubes in alternation. The equivalents of the gates 8 and 15 would still require to be provided, a version of the gate 8 would be required in the regenerative loop of each factor tube. The read outputs from the two tubes would be combined in a suitable buffer circuit if provision was not made for feeding two outputs separately to their respective destinations.

If separate storage units are employed, the generation of a common time-base waveform, with the requirement that the generated time-base waveform should flyback rapidly when a "1" digit is encountered during a "multiplier" scan and commence a "multiplicand" scan after a given delay, is no longer essential and some simplification of the time-base control circuits (unit 10 of Fig. 3) is possible. The time base waveform for the multiplier cathode ray tube can be generated by a simpler time-base circuit which commences the time base scan at $p_{41}$ and continues to the end of the full 40 digit period before normal flyback. The time base for the multiplicand cathode ray tube will be generated by a simple time base circuit which is triggered after a 2-digit delay by the first "1" digit encountered during each scan of the R cathode ray tube. Waveforms corresponding to the $R_1$ and $R_0$ waves, which would have specified polarities during the scanning periods of the multiplicand cathode ray tube would also require to be generated so that the equivalents of the $Y_R$ and $Y_D$ waves could be produced to control the illumination of the two cathode ray tubes selectively and to condition the gates (the equivalents of 8 in Fig. 3) in the regenerative loops and also the equivalent of gate 15 of Fig. 3, so that each "1" digit first encountered during a scan of the multiplier store will be erased while subsequent digits encountered in each scan are correctly regenerated.

We claim:

1. An electronic circuit arrangement for multiplying binary numbers comprising a first number storage device having at least two separate storage locations for holding the multiplier number and the multiplicand number respectively, said storage device including a regenerative loop including a reading device providing an external pulse signal train representative of a stored number, a writing device for controlling the form of stored number in accordance with an applied pulse signal train and an electric circuit including a first gate circuit between said reading and writing devices, said first gate circuit being controlled by an applied gate control signal, an accumulator comprising a further number storage device and an arithmetic unit for combining the number content of said storage device with a number represented by the form and timing of a pulse signal train applied to said arithmetic unit, circuit means including a second gate circuit also controlled by said gate control signal between said reading device of said first number storage device and said arithmetic unit for applying an output pulse signal train from said first number storage device to said accumulator, signal examining means for examining each digit interval of an applied number representing pulse signal train in turn and providing an output control pulse upon the occurrence of the first "1" representing signal in such applied pulse signal train, circuit means for supplying the output from said reading means of said first number storage device to said signal examining means and a control system for said first number storage device and said first and second gate circuits, said control system being supplied with said output control pulse from said signal examining means and providing for a regularly repetitive operation cycle comprising reading of said multiplier number content of said first number storage device until the occurrence of said control pulse and thereafter the reading of said multiplicand number content of said first number storage device with a time delay, measured from the commencement of the cycle, which is determined by the position in said read-out multiplier number of the first "1" digit, said control system providing a gate control signal for said first and second gate devices which maintains said first gate device closed during each reading of said multiplier number to inhibit regeneration of said examined first "1" representing signal of the multiplier number and opened during each reading of the multiplicand number to effect regeneration of said multiplicand number and which maintains said second gate device closed during reading of said multiplier number to inhibit its application to said accumulator and open during reading of said multiplicand number to allow transfer thereof to said accumulator.

2. An arrangement for multiplying two binary digital numbers in accordance with claim 1 which includes means for determining the sign of each of said multicand and multiplier numbers and further means, conditioned in accordance with said multiplicand and multiplier numbers being of like or unlike sign, for adjusting the sign of said product number in said accumulator.

3. An arrangement for multiplying two binary digital numbers according to claim 1 which includes provisions for dealing with negative numbers by means of complements which includes means for testing said multiplicand and multiplier numbers for sign during their recording in said first storage device, means controlled by said testing means for decomplementing said number in said storage means before commencing said examination of said multiplicand number and means controlled by said testing means for correcting the sign of the eventual product number in said accumulator device.

4. An electronic circuit arangement for multiplying two binary numbers which comprises a cathode ray tube storage device having at least a first and a second storage line for storing the multiplicand and multiplier numbers respectively, a regenerative loop including reading and writing circuits and a first gate circuit for inhibiting the regenerative loop under the influence of a first gate control signal, line scanning means and a time base generator connected thereto and beam deflecting means for selecting which of said storage lines is scanned by said line scanning means, said time base generator being controllable in the commencement and termination of its scanning operation by external control signals, an accumulator device having a signal input terminal and by which any number represented by the form and timing of an electric signal applied to said signal input terminal may be combined with any existing number content of said accumulator, signal examining means for examining in turn each digit interval of an applied serial pulse train representing, by the respective pulse content of its digit intervals, a binary number and providing an output control pulse upon the occurrence of the first examined "1" digit signal in such applied pulse train, circuit means including a second gate circuit controlled by a second gate control signal interconnecting said reading circuit of said cathode ray tube storage device with said signal input terminal of said accumulator and a control system connected to said time base generator, said beam deflecting means and said first and second gate circuits for repeatedly initiating an operation cycle which comprises the scanning of said second storage line with said first and second gate circuits in closed condition until the development of said control pulse by said signal examining means and thereafter the scanning of said first storage line with said first and second gate circuits in open condition.

5. An electronic arrangement according to claim 4 wherein said beam deflecting means comprises a two-stable-state trigger circuit having separate triggering and resetting input terminals and a common reversing input terminal, said control system providing a triggering input to said triggering input terminal at the commencement of a multiplying operation and a reversing input signal to said common reversing input terminal during each of the flyback or return periods of said time base generator.

6. An electronic circuit arrangement for multiplying two binary numbers and comprising a cathode ray tube storage device having first and second storage lines for holding the multiplicand and multiplier numbers respectively, a read output terminal from which a serial pulse signal train representative of either stored number may be derived and a regenerative loop for regenerating the respective digits of any stored number, said regenerative loop including a first gate circuit controlled by a first gate control signal, line scanning means including a saw-tooth time base waveform generator for said storage device, said time-base waveform generator being controlled in its run-down and its fly-back operations by a time-base control signal applied thereto, line selecting means including a beam deflection waveform generator for said storage device, said deflection waveform generator being controlled by external line control signals applied thereto, an accumulator device including a product-representing number storage device and an arithmetic unit having an input terminal by which any number represented by a serial pulse signal train applied to said input terminal may be combined with the existing number content of said accumulator number storage device, circuit means including a second gate device controlled by a second gate control signal interconnecting said read output terminal of said cathode ray tube storage device and said input terminal of said accumulator, pulse signal examining means having an input terminal connected to said read output terminal of said cathode ray tube storage device and operative to examine each successive digit interval of an applied pulse signal train in turn for the presence of a "1" representing digit signal and providing an output control pulse upon the occurrence of such a signal, said examining means being controlled in its operation by an applied examination control signal and control means for governing the cyclic operation of the arrangement, said control means being supplied with said control pulse and providing said first and second gate control signals, said time base control signal, said line control signal and said examination control signal whereby a plurality of successive operation cycles are effected during each of which the various successive digits of the stored multiplier number are read out from said cathode ray tube storage device with the first and second gate circuits closed and applied to said signal examining means until the generation of said control pulse, the arrival of such control pulse causing termination of reading of said multiplier number and the reading out of said multiplicand number from said cathode ray tube storage device with said first and second gate circuits opened.

7. An electronic circuit arrangement according to claim 6 wherein said beam deflection waveform generator comprises a two-stable-state trigger circuit having separate triggering input and resetting input terminals and a common reversing input terminal and wherein said control means provides an input triggering pulse to said triggering input terminal at the commencement of a multiplying operation and in which said control means provides a line control pulse signal to said common reversing input terminal at each fly-back operation of said time base waveform generator.

References Cited in the file of this patent

UNITED STATES PATENTS

| | | |
|---|---|---|
| 2,404,047 | Flory et al. | July 16, 1946 |
| 2,409,689 | Morton et al. | Oct. 22, 1946 |
| 2,435,841 | Morton et al. | Feb. 10, 1948 |
| 2,445,215 | Flory | July 13, 1948 |

OTHER REFERENCES

"A Functional Description of the Edvac," Moore School of Electrical Engineering, University of Pennsylvania, Philadelphia, Pennsylvania, November 1, 1949. Volume 1, pages 4–18 to 4–24; volume 2, drawing 104–3LD–2.